US012500944B2

(12) United States Patent
Hoffpauir, IV

(10) Patent No.: US 12,500,944 B2
(45) Date of Patent: Dec. 16, 2025

(54) METHODS AND APPARATUS FOR AUTOMATICALLY SECURING COMMUNICATIONS BETWEEN A MEDIATION DEVICE AND A LAW ENFORCEMENT DEVICE

(71) Applicant: Charter Communications Operating, LLC, St. Louis, MO (US)

(72) Inventor: Girard Hoffpauir, IV, Austin, TX (US)

(73) Assignee: Charter Communications Operating, LLC, St. Louis, MO (US)

( * ) Notice: Subject to any disclaimer, the term of this patent is extended or adjusted under 35 U.S.C. 154(b) by 597 days.

(21) Appl. No.: 17/590,688

(22) Filed: Feb. 1, 2022

(65) Prior Publication Data

US 2023/0247065 A1 Aug. 3, 2023

(51) Int. Cl.
*H04L 9/40* (2022.01)

(52) U.S. Cl.
CPC .......... *H04L 63/30* (2013.01); *H04L 63/0823* (2013.01); *H04L 63/166* (2013.01)

(58) Field of Classification Search
CPC ............. H04L 63/0428; H04L 63/0823; H04L 63/166; H04L 63/30; H04L 63/306; H04W 12/80
See application file for complete search history.

(56) References Cited

U.S. PATENT DOCUMENTS 7,730,521 B1 * 6/2010 Thesayi .............. H04L 63/1408 726/4
8,307,203 B2 * 11/2012 Fraleigh .............. H04L 63/0823 726/28

(Continued)

FOREIGN PATENT DOCUMENTS

WO WO-2008086639 A1 * 7/2008 ........... H04L 63/306
WO WO-2012079653 A1 * 6/2012 ........... H04L 63/306

(Continued)

OTHER PUBLICATIONS

Catalyst 6500 Series Switched Lawful Intercept Configuration Guide, Cisco IOS Software Release 12.2(33)SXH and later releases, Aug. 2007, 22 Pages, Cisco Systems, Inc.

(Continued)

*Primary Examiner* — David Garcia Cervetti

(74) *Attorney, Agent, or Firm* — Straub & Straub; Michael P. Straub; Stephen T. Straub

(57) ABSTRACT

Methods and apparatus for automatically securing communications between a mediation device (MD) and a law enforcement device, such as an agent's terminal, to which intercepted communications, e.g., traffic, is sent are described. Based on a desired intercept request to be implemented, a Lawful Interception (LI) administration (admin) device (LID) identifies at least a first mediation device (MD) which will be involved in implementing the intercept request. The LID then proceeds to enable the use of a private certificate authority to automatically generate and provision the MD and a law enforcement device with certificates and private keys via an automated process. Each of the MD and law enforcement device automatically obtain a security certificate and corresponding private key. The security certificates and corresponding private keys are then used, in an automated manner, to establish a mutual TLS connection between the MD and the law enforcement device.

20 Claims, 18 Drawing Sheets

(56) References Cited

U.S. PATENT DOCUMENTS 8,537,818 B1 * 9/2013 Thesayi .................. H04L 69/22 709/227
8,792,505 B2 * 7/2014 Iovieno ............... H04M 3/2281 370/252
8,811,956 B2 * 8/2014 Venkatachalam ... H04M 3/2281 455/414.1
8,843,750 B1 * 9/2014 Sokolov .............. H04L 63/0823 713/175
8,856,920 B2 * 10/2014 Khan .................... H04L 63/306 713/153
9,204,293 B2 * 12/2015 Imbimbo .............. H04L 63/308
9,456,009 B2 * 9/2016 Smoyer ................... H04L 63/30
9,961,078 B2 * 5/2018 Van Den Broeck .... H04L 63/12
10,778,659 B2 * 9/2020 Tola .......................... H04L 9/14
11,133,999 B1 * 9/2021 Brosnan .................. H04L 47/36
11,349,821 B2 * 5/2022 Hallam-Baker ...... H04L 9/0838
11,777,998 B2 * 10/2023 Carotenuto ............. H04W 4/50 726/12
2003/0005291 A1 * 1/2003 Burn ....................... G06F 21/34 726/26
2003/0182559 A1 * 9/2003 Curry ...................... H04L 63/06 713/189
2004/0157629 A1 * 8/2004 Kallio ................... H04M 7/006 455/450
2004/0255126 A1 * 12/2004 Reith .................. H04L 63/1408 713/183
2006/0005011 A1 * 1/2006 Satoh ...................... G06F 21/34 713/156
2006/0085633 A1 * 4/2006 Balfanz .................. G06Q 20/02 713/155
2006/0282662 A1 * 12/2006 Whitcomb .......... H04L 63/0407 713/156
2007/0174469 A1 * 7/2007 Andress .............. H04L 63/0884 709/227
2009/0034510 A1 * 2/2009 Smoyer ............... H04M 3/2281 370/352
2009/0100040 A1 * 4/2009 Sheppard .............. H04L 63/306 707/999.005
2009/0158031 A1 * 6/2009 Wan .................... H04L 41/0806 713/156
2010/0086119 A1 * 4/2010 De Luca ............. H04M 7/0063 379/213.01
2010/0310077 A1 * 12/2010 Sun ....................... H04L 9/3263 380/278
2011/0142240 A1 * 6/2011 Yoon ..................... H04L 63/302 380/278
2011/0176460 A1 * 7/2011 Lovieno .................. H04L 63/30 370/259
2012/0069971 A1 * 3/2012 Jayaraman ............ H04L 63/306 379/35
2013/0191631 A1 * 7/2013 Ylonen ................. H04L 63/164 713/153
2013/0236019 A1 * 9/2013 Zaverucha ............ H04L 9/3263 380/278
2013/0318354 A1 * 11/2013 Entschew ............. H04L 9/3247 713/175
2014/0010228 A1 * 1/2014 Maione ................... H04L 63/30 370/352
2014/0156991 A1 * 6/2014 Baskaran ............. H04L 63/205 713/165
2014/0207939 A1 * 7/2014 Mraz ....................... H04L 43/00 709/224
2014/0286177 A1 * 9/2014 Ni ......................... H04L 43/028 370/250
2014/0365781 A1 * 12/2014 Dmitrienko ........... G06F 21/335 713/185
2015/0006887 A1 * 1/2015 Brand ..................... G06F 21/33 713/156
2015/0200972 A1 * 7/2015 Suryavanshi ....... H04L 63/0428 726/1
2015/0341392 A1 * 11/2015 Marfia .................. H04L 63/306 370/259
2016/0182571 A1 * 6/2016 Van Phan ............... H04L 63/06 726/12
2017/0163629 A1 * 6/2017 Law .................... H04L 63/0823
2018/0034858 A1 * 2/2018 Gummaraju ............ H04L 63/08
2020/0179429 A1 * 6/2020 Vuckovic ............... C07H 23/00
2021/0119990 A1 * 4/2021 Law ...................... H04L 9/3268
2021/0385255 A1 * 12/2021 Imbimbo .............. H04L 63/306
2022/0006800 A1 * 1/2022 Duchastel ............. H04L 63/083
2022/0263873 A1 * 8/2022 Somma ................. H04L 63/302
2023/0007474 A1 * 1/2023 Ni ......................... H04L 63/029
2023/0028642 A1 * 1/2023 Li .......................... H04L 63/168
2023/0179429 A1 * 6/2023 Rosenthol ............... H04L 63/20 713/156
2023/0224336 A1 * 7/2023 Hoffpauir, IV ..... H04L 63/0428 726/13

FOREIGN PATENT DOCUMENTS

WO WO-2015008158 A2 * 1/2015 ............ H04W 12/02
WO WO-2020050755 A1 * 3/2020 ........... H04L 63/306
WO WO-2020071972 A1 * 4/2020 ............. H04L 63/30
WO WO-2025032037 A1 * 2/2025 ............ H04W 76/15

OTHER PUBLICATIONS

Creating Private Certificates Authorities for Internal Use, Sep. 21, 2021, 10 pages, SecureW2, https://www.securew2.com/blog/creating-private-certificates.

Lawful Interception, Jul. 19, 2021, 9 Pages, Wikipedia, https://en.wikipedia.org/wiki/Lawful_interception.

TLS Interception, July 19, 2021, 6 pages,ORG Open Rights Group, https://wiki.openrightsgroup.org/wiki/TLS_interception.

Vinugayathri Chinnasamy, Enabling TLS 1.3 Certificate—Are You Ready for Moving Forward?, Indusface, Jan. 22, 2021, 8 pages, downloaded from https://www.indusface.com/blog/enabling-tls-1-3-certificate-are-you-ready-for-moving-forward/ on Sep. 17, 2021.

* cited by examiner

METHODS AND APPARATUS FOR AUTOMATICALLY SECURING COMMUNICATIONS BETWEEN A MEDIATION DEVICE AND A LAW ENFORCEMENT DEVICE

FIELD

The present application relates to lawful intercept and, more particularly, to methods and apparatus for securing communications between a mediation device which receives intercepted communications and a law enforcement device.

BACKGROUND

Lawful intercept of communications traffic is important from both a legal and public service perspective. While methods and apparatus exist for intercepting traffic at a point of interception such as a network switch or router and communicating it to a meditation device which might then be responsible for supplying to a law enforcement device for review, security concerns abound with regard to the interception and forwarding process. These concerns relate in part to the fact that intercepted communications themselves might by intercepted and/or monitored as they are being communicated between devices in a system implementing a lawful intercept.

Communications between a point of intercept and a mediation device normally occur within the same network. The forwarding of intercepted device may occur in some systems without particular security concerns under the assumption that the traffic between network devices within a network is relatively secure and not readily susceptible to interception.

The forwarding of intercepted traffic from a mediation to a law enforcement device often involves the communication of the intercepted traffic from the network in which the traffic was intercepted to a network in which the law enforcement device, in a law enforcement agency, to which intercepted traffic is to be provided is located In an attempt to secure such traffic being communicated outside the network in which the interception occurred, a Virtual Private Network (VPN) is sometimes used. The use of a VPN normally requires the use of firewalls at each end to create and establish VPN tunnels.

From the above it should be appreciated that there is a need for improved methods and/or apparatus for securing intercepted traffic and/or other communications between devices participating in a lawful intercept.

In particular it would be desirable if methods and/or apparatus could be developed for securing communications relating to a lawful intercept which occur between a mediation device and a law enforcement device to which intercepted traffic is to be provided.

SUMMARY

Methods and apparatus for automatically securing communications between a mediation device (MD), e.g., a lawful interception MD, and a law enforcement device, e.g., a device of a law enforcement agent or a device in a law enforcement network to which intercepted traffic is forwarded, are described. Based on a desired intercept request to be implemented, a Lawful Interception (LI) administration (admin) device (LID) identifies at least a first mediation device (MD). The LI administrator then proceeds to enable the use of a private certificate authority to automatically generate and provision the MD and law enforcement device with certificates and private keys via an automated process. As part of the process each of the MID and law enforcement device automatically obtains a security certificate and corresponding private key. The security certificates and corresponding private keys are then used, in an automated manner, to establish a mutual TLS connection between the MD and the law enforcement device to which intercepted traffic is communicated.

Since the process is automated, it can be easily scaled to support a large number of MDs and/or law enforcement devices, e.g., agent terminals or other devices in a law enforcement network which receive intercepted traffic without the need for a large amount of human operator involvement with regard to establishing secure connections. Security in such a system can thus be provided without having to use firewalls to establish secure tunnels and/or without the need for a human operator to individually set up the individual mutual TLS connections and/or be directly involved with the requesting of individual security certificates or the generation of each individual security certificate involved or used in securing intercepted traffic.

Intercepted traffic is communicated in a secure manner over the mutual TLS connection which is automatically established between the MD and law enforcement device to which intercepted traffic is forwarded by the MD.

A method of supporting lawful intercept, in accordance with some embodiments, comprises: operating a law enforcement device to receive information from a mediation device (MD) to be used in requesting a security certificate from a lawful intercept certificate authority; operating the law enforcement device to request a security certificate and private key from the LICA; and operating the law enforcement device to establish a mutual TLS connection with the MD using a private key corresponding to the law enforcement device that is supplied by the LICA.

All of the features discussed in the above summary are not included in all embodiments and it should be appreciated that various embodiments include different combinations of features.

Numerous features and variations on the above described methods and apparatus are possible. Various embodiments, features and variations are described in more detail in the detailed description which follows.

The detailed description which follows describes additional features, details and embodiments which can be used alone or in combination.

DETAILED DESCRIPTION

Figure 1:
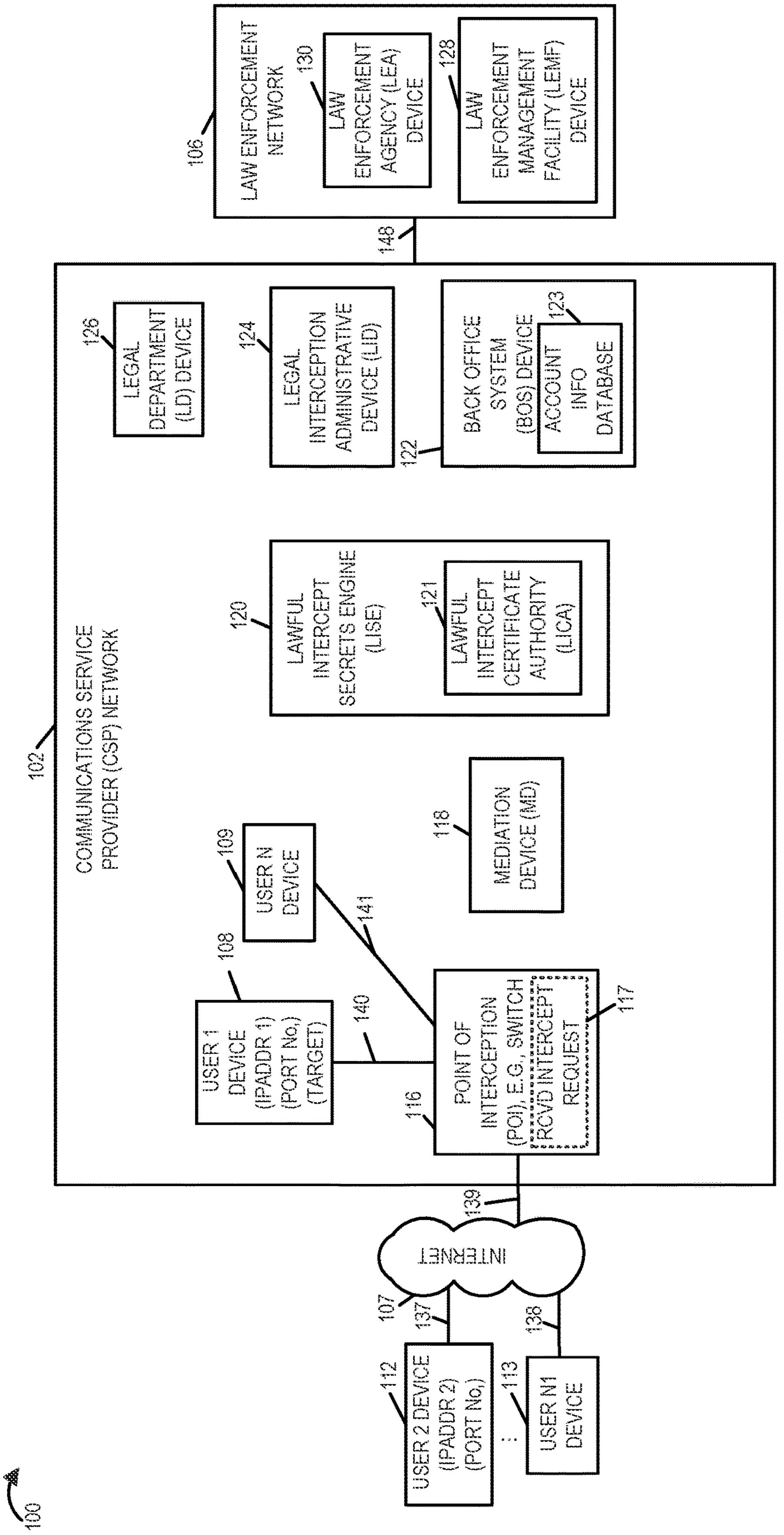
FIG. 1 is a drawing of an exemplary communications system in accordance with an exemplary embodiment.

FIG. 1 is a drawing of an exemplary communications system 100 in accordance with an exemplary embodiment. Exemplary communications system 100 includes a communications service provider (CSP) network 102 and a law enforcement network 106 coupled together via communications link 148 as shown.

The CSP network 102 includes a plurality of user devices including user device 1 108 and user N device 109. The communications system 100 further includes a plurality of user devices including user device 2 112 and user device N1 device 113, which are outside the CSP network 102 in the example of FIG. 1, user device 1 108, which is the exemplary intercept target, is using IP address IPADDR1. User device 2 112 is using IP address IPADDR2. The CSP network 102 further includes a point of interception (POI) device 116, e.g., a switch, a mediation device (MD) 118, a lawful intercept secrets engine (LISE) 120 including a lawful intercept certificate authority (LICA) 121, a legal department (LD) device 126, e.g., a LD server, a legal interception administrative device (LID) 124, and a back office system (BOS) device 122. The various devices 108, 109, 116, 118, 120, 122, 124, 126 within the CSP network 102 may be, and sometimes are, coupled together via network links, other network devices. e.g., routers, and/or the Internet. POI device 116 is coupled to user device 1 108 via communications link 140. POI device 116 is coupled to user device N 109 via communications link 141. POI device 116 is coupled to user device 2 112 via communications link 139, Internet 107 and communications link 137 POI device 116 is coupled to user device N1 113 via communications link 139, Internet 107 and communications link 138.

Law enforcement network 106 is coupled to the CSP network 102 via communications link 148. Law enforcement network 106 includes a law enforcement agency (LEA) device 130 and a law enforcement management facility (LEMF) device 128 coupled together and to communications link 148, e.g., via an internal law enforcement network communications links, other communications links, routers, other network devices, coupling devices, and/or the Internet.

Point of interception (POI) device 116 can be, and sometimes is, configured to lawfully intercept communications passing through the POI device 116, e.g., based on information including an IP address of an interception target received in an intercept request. In this example POI device 116 includes a received intercept request 117, which targets IPADDR1, which corresponds to user device 1 108, which is the target. Lawful intercept secrets engine (LISE) 120, sometimes referred to as a law enforcement secrets engine, includes a lawful intercept certificate authority (LICA) 121. LICA 121 generates certificate/private key pairs. A certificate, sometimes referred to as a security certificate, includes a public key and other information, e g, identification information. The private key, of a public/private key pair, can be used to decrypt information that was encrypted using the public key of the key pair.

Back-office system (BOS) device 122 includes an account information database 123, which includes account information including an IP address and port number corresponding to an account number of a potential intercept target.

Figure 2A:
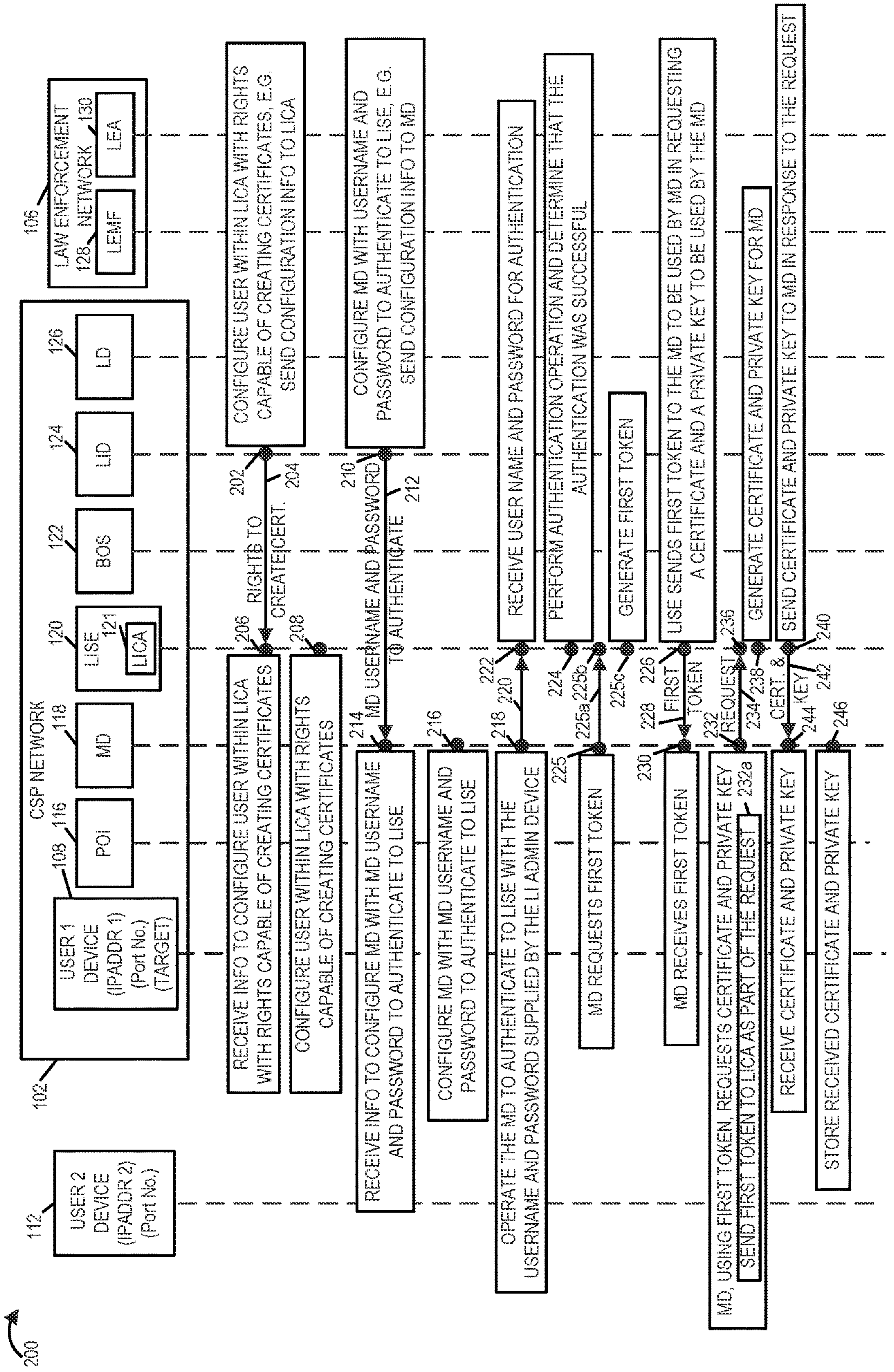
FIG. 2A is a first part of a signaling diagram illustrating an exemplary communications method in accordance with an exemplary embodiment.
Figure 2B:
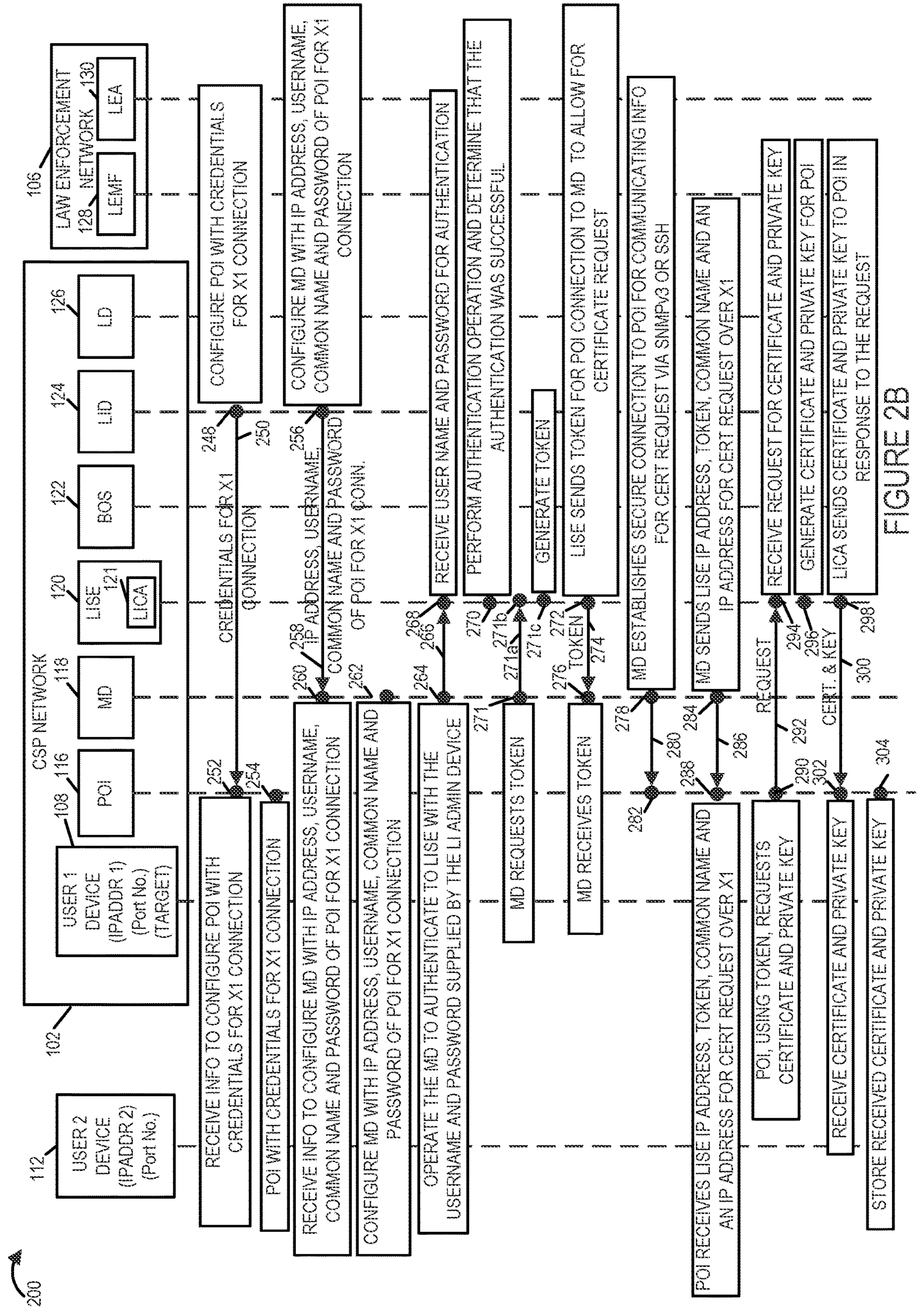
FIG. 2B is a second part of a signaling diagram illustrating an exemplary communications method in accordance with an exemplary embodiment.
Figure 2C:
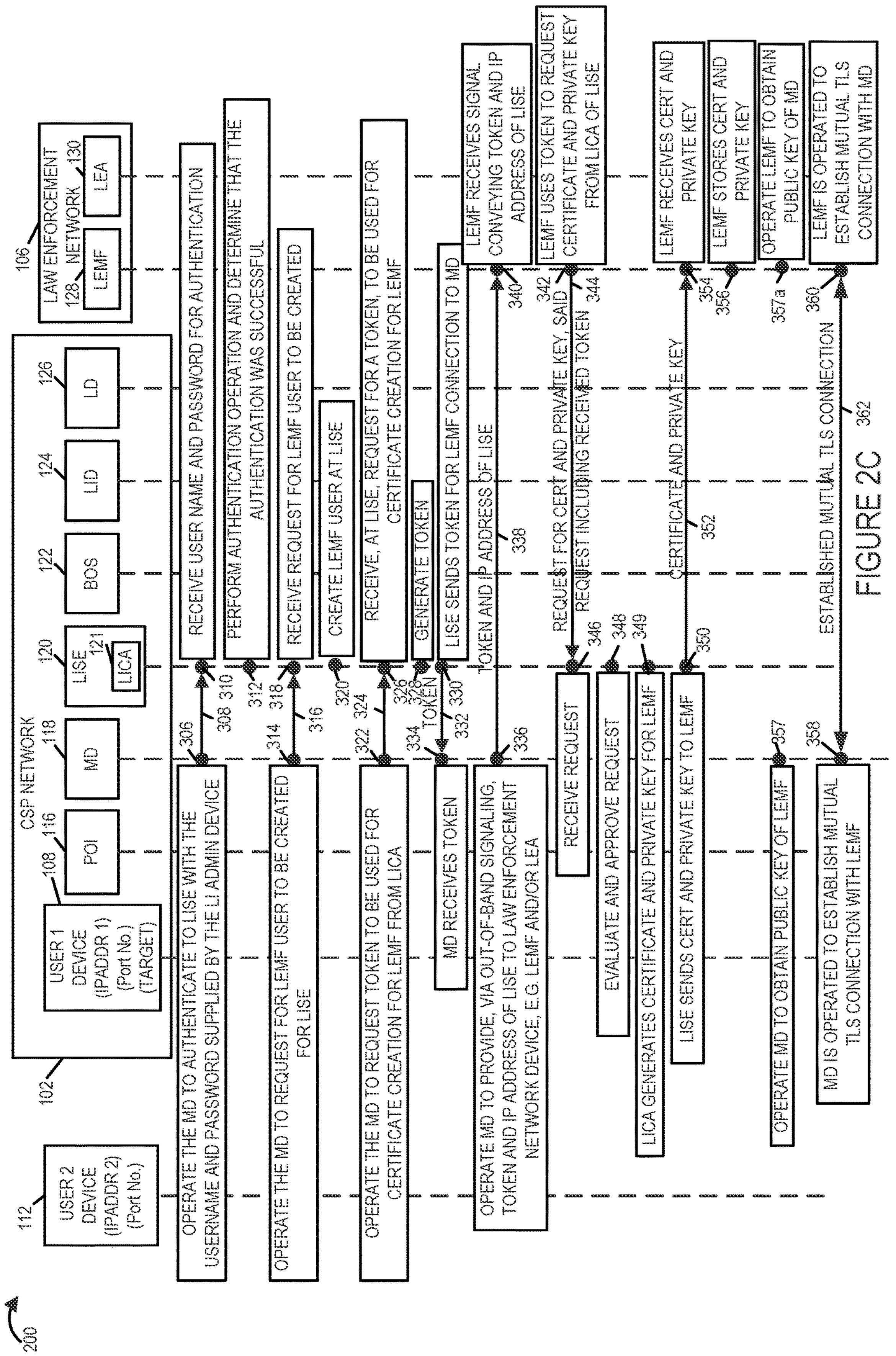
FIG. 2C is a third part of a signaling diagram illustrating an exemplary communications method in accordance with an exemplary embodiment.
Figure 2D:
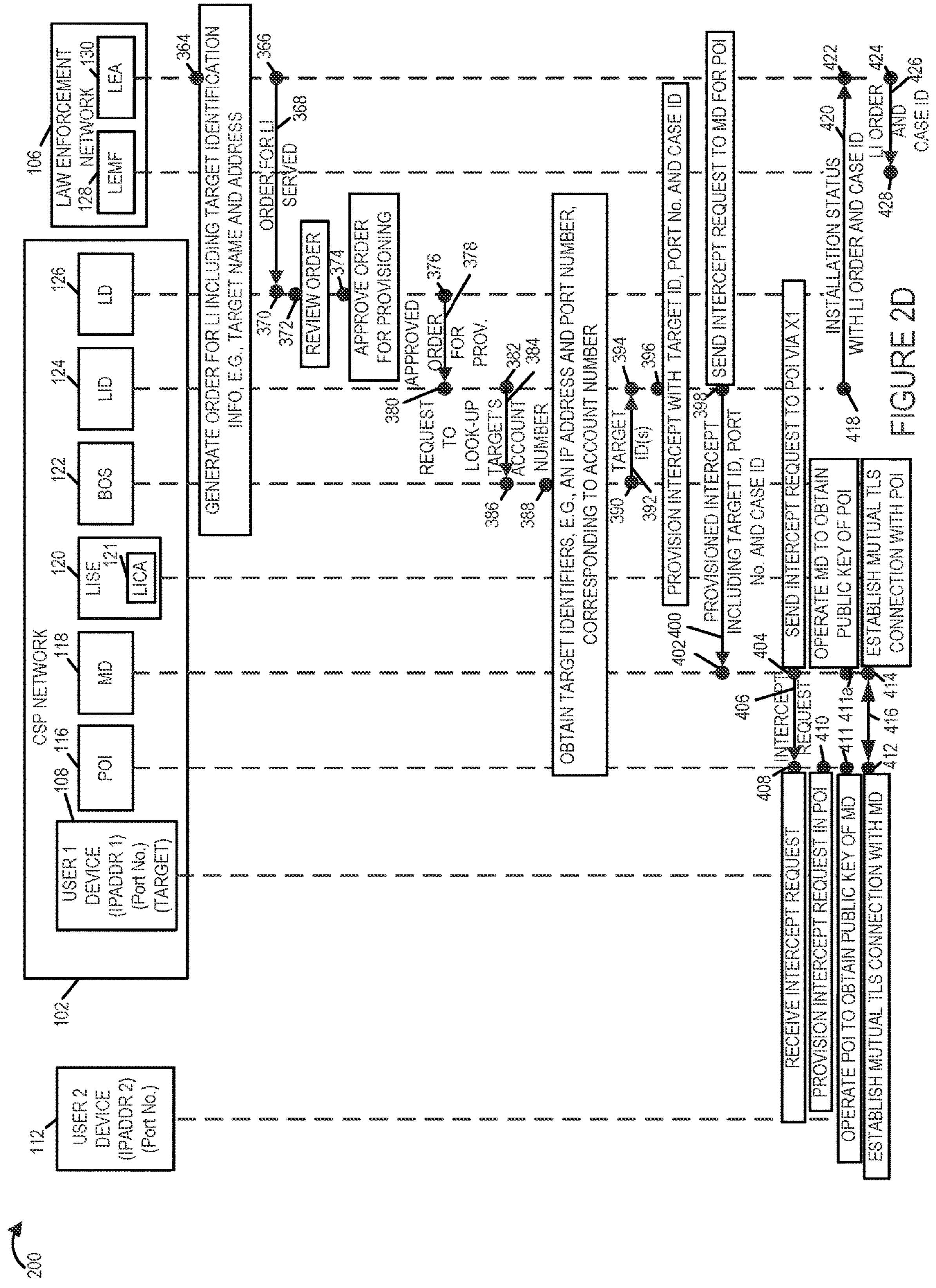
FIG. 2D is a fourth part of a signaling diagram illustrating an exemplary communications method in accordance with an exemplary embodiment.
Figure 2E:
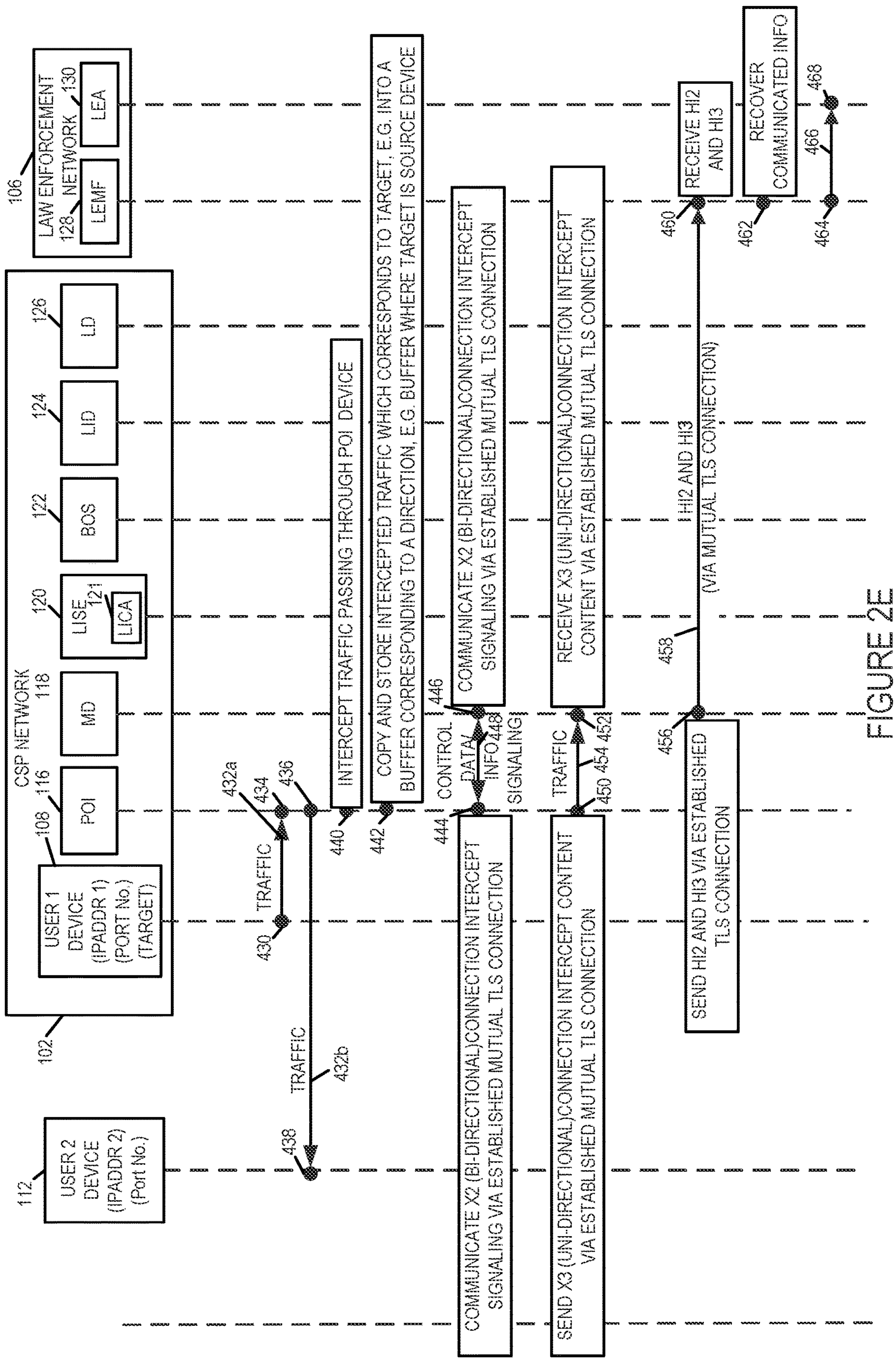
FIG. 2E is a fifth part of a signaling diagram illustrating an exemplary communications method in accordance with an exemplary embodiment.
Figure 2:
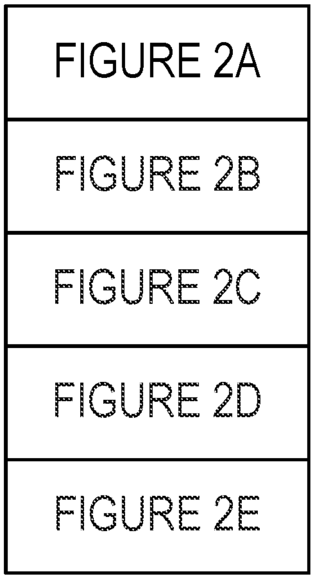
FIG. 2 comprises the combination of FIG. 2A, FIG. 2B, FIG. 2C, FIG. 2D and FIG. 2E.

FIG. 2, comprising the combination of FIG. 2A. FIG. 2B, FIG. 2C, FIG. 2D and FIG. 2E is a signaling diagram 200 illustrating an exemplary communications method implemented by devices of exemplary communications system 100 in accordance with an exemplary embodiment.

In step 202, legal interception administrative device (LID) 124 is operated to configure user within LICA 121 with rights capable of creating certificates and/or a MD user with authority to request tokens which can be used to have a certificate created and/or with authority to request a security certificate. Thus in step 202, LID 124 sends signals 204 including configuration information including rights capable of creating certificates to LISE 120 which includes LICA 121. In step 206, the LISE 120 receives signal 205 conveying the information to configure user within LICA 121 with rights capable of creating certificates. Operation proceeds from step 206 to step 208, in which the LISE 120 configures user within LICA 121 with rights capable of creating certificates, e.g. user liseadm is created on LISE (where LISE IP address=10.2.2.2).

In step 210, legal interception administrative device (LID) 124 is operated to configure mediation device (MD) 18 with a username and password to authenticate to LISE 120. Thus in step 210. LID 124 sends signals 212 to MD 118, said signals 212 including configuration information including a MD username and password to be used by the MD 118 to authenticate to LISE 120. In step 214, the MD 118 receives signal 212 conveying a MD username and password, e g, supplied by the LID 124, to be used by the MD 118 to authenticate to LISE 120. The username and password correspond to a user account with authorization to request certificates to be created by the lawful intercept certificate authority (LICA) 121. Operation proceeds from step 214 to step 216, in which the MD 118 configures the MD 118 with the received MD username and password supplied by the LID 124, and thus allowing the MD 118 to authenticate to LISE 120, e.g., the MD 118 is configured with username liseadm and a password.

In step 218 the MD 118 is operated to authenticate to LISE 120 with the username and password supplied by legal intercept administrative device (LID) 124, e.g., by sending authentication signals 220 including the MD username and password, to LISE 120. In step 222, the LISE 120 receives the authentication signals 220 including the MD username and password. In step 224 the LISE 120 performs an authentication operation, e.g., verifying the received MD username and password, match stored information, and determines that the authentication was successful. Operation proceeds from step 224 to step 225.

In step 225 the MD 118 sends a request 225*a* for a token, e.g., a security token, to the LISE 120. In step 225*b* the LISE 120 receives the token request, and in step 225*c*, the LISE 120 generate a first token. Operation proceeds from step 225*c* to step 226.

In step 226, the LISE sends signals 228 including a first token to the MD 118, said first token to be used by the MD 118 in requesting a certificate and private key to be used by the MD 118. The first token is to be subsequently presented, e.g., in a request sent to the LISE 120 and directed to the LICA 121, when requesting a security certificate and corresponding private key from the LICA 121 of the LISE 120. In step 230 the MD 118 receives signal 228 and recovers the first token, e.g., first security token, which is communicated. Operation proceeds from step 230 to step 232. In step 232 the MD 118, using the first token, requests a certificate and private key for the MD 118 from the LICA 121 included in the LISE 120. Thus, in step 232, MD 118 sends signal 234 to LISE 120, said signal 234 including a request directed to the LICA 121 for a certificate and private key for the MD 118, said request including the first token. For example, in step 232 liseadm requests a certificate for MD1.abc.xyz.

In some embodiments, the MD 118 automatically sends the request for the certificate and corresponding private key for the MD 118 in response to receiving the MD username and password.

In step 236, the LISE 120 including LICA 121 receives signal 234 including the request, and authenticates the request using the received first token in the received request. In response to the authentication being successful, operation proceeds from step 236 to step 238, in which the LICA 121 generates a certificate and private key to be used by the MD 118 and stores the generated certificate and private key for MD 118 in memory, e.g., memory within LICA 121 or within LISE 120. Operation proceeds from step 238 to step 240.

In step 240, the LISE 120 sends the generated certificate and private key to MD 118, which was generated by LICA 121, in signals 240 in response to the received request of signal 234. For example, in step 240 the LISE 120 sends the certificate and corresponding private key for MD1.abc.xyz. Operation proceeds from step 240 to step 244.

In step 244 the MD 118 receives signal 242 and recovers the communicated MD certificate and corresponding MD private key from the LICA 121. The MD certificate includes a signature of the LICA 121 and a MD public key corresponding to the MD private key In step 246, the MD 118 stores the received MD certificate and MD private key for MD 118, which was received in step 244.

In step 248, legal interception administrative device (LID) 124 is operated to configure POI device 116 with credentials for X1 connection. Thus, in step 248, LID 124 sends signals 250 to POI 116, said signals 250 including configuration credentials for POI for X1 connection. For example, in step 248 the administrator device LID 124 configures POI1.abc.xyz with poiadm username and password. In step 252, the POI device 116 receives signal 250 conveying the credentials for POI for X1 connection. Operation proceeds from step 252 to step 254, in which the POI device 116 configures POI device 116 with credentials for X1 connection.

In step 256, legal interception administrative device (LID) 124 is operated to configure mediation device (MD) 118 with an IP address, username, common name, and password of POI 116 for X1 connection. Thus, in step 256, LID 124 sends signals 258 to MD 118, said signals 258 including configuration information including a IP address, username, common name and password of POI 116 for X1 connection. For example, in step 256 the administrator device LID 124 configures MD 118 with POI1.abc.xyz, poiadm, poipass and 10.11.1. In step 260, the MD 118 receives signal 258 conveying an IP address, username, common name and password of POI 116 for X1 connection. Operation proceeds from step 260 to step 262, in which the MD 118 configures the MD 118 with the received IP address, username, common name and password of POI 116 for X1 connection, supplied by the LID 124.

In step 264 the MD 118 is operated to authenticate to LISE 120 with the username and password supplied by legal intercept administrative device (LID) 124, e.g., by sending authentication signals 266 including the MD username and password, to LISE 120. For example, in step 264 the MD 118 authenticates with LISE 120 using liseadm. In step 266, the LISE 120 receives the authentication signals 266 including the MD username and password In step 270 the LISE 120 performs an authentication operation, e.g., verifying the received MD username and password match stored information, and determines that the authentication was successful. Operation proceeds from step 270 to step 271.

In step 271 the MD 118 sends a request 271*a* for a token to the LISE 120. In step 271*b* the LISE 120 receives the token request, and in step 271*c*, the LISE 120 generates a token (e.g., 1234567890). Operation proceeds from step 271*c* to step 272.

In step 272, the LISE sends signals 274 including a token (e.g., 1234567890) to the MD 118 to be used subsequently by the MD 118 in requesting a certificate and private key. In step 276 the MD 118 receives signal 274 and recovers the token which is communicated. Operation proceeds from step 276 to step 278. In step 278 the MD 118 is operated to establish a secure connection to POI 116 for communicating information for a certificate request via simple network management protocol version 3 (SNMPv3) or secure shell (SSH) protocol, e.g., via sending secure connection establishment signals 286 to POI device 116. Fore example, in step 278 the MD 118 connects to POI1.abc.xyz using poiadm and poipass. In step 282 the POI 116 receives secure connection establishment signals 282 and is operated to establish a secure session with the MD 118. In step 284 the MD 118 sends signals 286 over X1 to POI 116, said signals 286 including the LISE IP address (e.g., 10.2.2.2), the token (e.g., 1234567890) received in step 276, the common name (e.g., POI1.abc.xyz) and SAN/IP address (e.g., 10.1.1.1) to which the certificate request is to be sent. Operation proceeds from 284 to step 288. In step 288 the POI device 116 receives signals 286, communicated over X1, and recovers the communicated LISE IP address (e.g., 10.2.2.2), token (e.g., 1234567890), common name for certificate request (e.g., POI1.abc.xyz) and SAN/IP Address for certificate request (e.g., 10.1.1.1). Operation proceeds from step 288 to step 290.

In step 290 the POI device 116, using the received token of step 288, requests a certificate and private key. Thus, in step 290 the POI device 116 sends signal 292 to USE 120, said signals 292 including a request for a certificate and private key for the POI 116, said request including the received token from step 288. Fore example, in step 290 the POI 116 uses the token (1234567890) to connect to LISE (10.2.2.2) and request certificate created for POI1.abx.xyz and 10.1.1.1. In step 294 the LISE 120 receives signals 292, recovers the communicated request for a certificate and private key, said request including the token. In step 294 the LISE 120 validates the certificate request using the received token. In response to a successful validation of the request, the operation proceeds from step 294 to step 296. In step 296, the LICA 121 of the LISE 120 generates a certificate and private key for the POI device 116. Operation proceeds from step 296 to step 298. In step 298, the LICA 121 of the LISE 120 sends the generated certificate and private key of step 296, in signal 300 to the POI device 116 in response to the request of signal 292. For example, in step 298 the LISE 120 sends POI1 certificate and corresponding private key to POI device 116. In step 302 the POI device 116 receives signal 300 and recovers the communicated certificate and private key. In step 304 the POI device 116 stores the received certificate and private key, as the POI device's certificate and corresponding private key pair.

In step 306, the MD 118 is operated to authenticate to LISE 120 with the username and password previously supplied by the legal intercept administrative device (LID) 124 in signal 212, e.g., the MD 118 sends authentication signal 308 to LISE 120, said authentication signal including the username and password. In step 310 the LISE 120 receives signal 308 and recovers the username and password communicated in signal 308. Operation proceeds from step 310 to step 312. In step 312 the LISE 120 performs an authentication operation, e.g., comparing the received username and password to a stored username and password corresponding to MD 118, and determines that the authentication is successful.

In step 314, the MD 118 is operated to request for a LEMF user to be created for LISE 120, e.g., in step 314 the MD device 118 generates and sends signal 316 to USE 120, said signal 316 conveying a request for LEMF user to be created. In step 318, the LISE 120 receives the request of signal 316. Operation proceeds from step 318 to step 320. In step 320 the LISE creates LEMF user at LISE 120. Operation proceeds from step 320 to step 322.

In step 322 the MD 118 is operated to request a token to be used for certificate creation for LEMF 128 from LICA 121, e.g., the MD 118 generates and sends signal 324 to LISE 120, said signal 324 including a request for a token. In 326 the LISE 120 receives the request for a token to be used for certificate creation for LEMF. Operation proceeds from step 326 to step 328. In step 328 the LISE 120 generates a token. Operation proceeds from step 328 to step 330.

In step 330 the LISE 120 sends signal 332 including a token for LEMF connection to MD 118. In step 334 the MD 118 receives signal 332 and recovers the communicated token. Operation proceeds from step 334 to step 336.

In step 336 the MD 118 is operated to provide, via out-of-band signaling, the received token (of step 334) and the IP address of LISE 120 to the law enforcement agency network 106, e.g., to LEMF device 128 and/or to LEA device 130. For example, in step 336 the MD 118 sends signal 338 to LEMF device 128, via out-of-band signaling, said signal 338 conveying the received token of step 334 and the IP address of LISE 120. In step 340 LEMF device 128 receives signal 338 and recovers the token and IP address of LISE 120. In step 342, LEMF device 128 uses the received token to request a certificate and private key from LISE 120, e.g., LEMF device 120 sends signal 344 to LISE 120, said signal 344 conveying a request for a certificate and private key, said request including the received token. In step 346, the LISE 120 receives signal 344 and recovers the communicated request for a certificate and private key for LEMF 128, said request including a token. In step 348, the LISE, evaluates the request, e.g., using the received token, determines the request is valid, and approves the request. In response to the approved request, operation proceeds from step 348 to step 350.

In step 350 the LISE 120 sends the certificate and private key corresponding to the LEMF device 128 via signal 352 to LEMF device 128. In step 354 LEMF device 128 receives signal 358 and recovers the communicated certificate and corresponding private key In step 356, the LEMF 128 stores the received certificate and corresponding private key pair for the LEMF in the LEMF device 128.

In step 357 the MD 118 is operated to obtain the public key of the LEMF 128, e.g., the MD 118 sends a request to the LICA 121 of the LISE 120 for the public key of LEMF 128, and receives in a response message the public key of the LEMF 128. In step 357*a* the LEMF 128 is operated to obtain the public key of the MD 118, e.g., the LEMF 128 sends a request to the LICA 121 of the LISE 120 for the public key of MD 118, and receives in a response message the public key of the MD 118.

In step 358, the MD 118 is operated to establish a mutual TLS connection with the LEMF 128. In step 360, the LEMF is operated to establish a mutual TLS connection with the MD 128. Bi-directional arrow 362 represents the established mutual TLS connection between MD 118 and LEMF device 128.

In step 364 law enforcement agency (LEA) device 130 generates an order for lawful intercept (LI) including target identification information, e.g., a target name and address. Operation proceeds from step 364 to step 366.

In step 366 the LEA device 130 sends the generated order for LI intercept 368 to the legal department (LD) device 126 of the communications service provider (CSP) network 102. In step 370, the LD device 126 receives the order In step 372, the LD device 126 reviews the order. In step 374 the LD device 126 approves the order for provisioning. In step 374 the LD device 126 sends the approved LI order 378 to the lawful interception administrative device (LID) 124 for provisioning. In step 380 the LID 124 receives the approved LI order for provisioning, and in step 382 the LID 124 generates and sends a request 384 to look-up the target's account number to the back office system (BOS) 122. In step 386, the BOS 122 receives the request 222 and obtains the target's account number. In step 388 the BOS 122 obtains target identifiers, e.g., an IP address and a port number corresponding to the account number of the target. In step 390 the BOS 122 generates and sends message 392 including target ID(s) to the LID 124. In step 394 the LID 124 receives message 392 and recovers the communicated target IDs. In step 396 the LID 124 provisions the intercept with target IDs and a case ID. In step 398, the LID 124 sends the provisioned intercept (e.g., Intercept 1) including target IDs and the case ID 400 to the mediation device (MD) 118. In step 402 the MD 118 receives the provisioned intercept including target IDs and the case ID 400, recovers the communicated information, and stores the recovered information. For example, in step 402 Intercept 1 is created on the MD 118. In step 404 the MD 118 generates and sends, via X1, an intercept request 406, e.g., for all traffic of the target, to the point of intercept (POI) device 116, e.g., a switch. For example, the MD 118 in step 404 uses poiadm user to provision the intercept. The intercept request 406 includes the IP address and port number of the target. In step 408 the POI device 116 receives the intercept request 406, which was communicated via XL. In step 410 the POI device 116 provisions the received intercept request in the POI device 116.

In step 411 the POI device 116 is operated to obtain a public key of the MD 118, e.g., the POI device 116 sends a request to the LICA 121 of the LISE 120 for the public key of MD 118, and receives in a response message the public key of the MD 118. In step **411*a* the MD 118 is operated to obtain a public key of the POI device 116, e.g., the POI device 116 sends a request to the LICA 121 of the LISE 120 for the public key of MD 118, and receives in a response message the public key of the MD 118**.

In step 412 the POI device 116 is operated to establish, using the POI private key and a MD public key, a mutual TLS connection with the MD device 118. In step 414 the MD device 118 is operated to establish, using the MD private key and a POI public key, a mutual TLS connection with the POI device 120. Thus, in steps 412 and 414 the POI device 116 and the MD 118 use each others public keys to mutually authenticate. Bi-directional arrow 416 represents the established mutual TLS connection between the MD 118 and the POI device 116.

In step 418 the LID 124 generates and sends message 420 including installation status, e.g., installation complete, with the LI order and case ID to the LEA device 130. In step 422 the LEA device 130 receives message 420, and in response, in step 424 the LEA device 130 generates and sends a copy of the LI order and case ID 426 to the LEMF 126 which receives and stores the information in step 428.

In step 430 user device 1 108 generates and sends traffic signals toward user device 2 112, via a path including: i) a first path segment between user device 1 108 and POI device 116, as indicated by arrow **432*a*, and ii) a second path segment between POI device 116 and user device 2 112, as indicated by arrow 432*a*. In step 434 POI device receives the traffic signals from user device 1 108. In step 436 POI device sends, e.g., forwards, the received traffic signals to user device 2 438. In step 440 POI device 116 intercepts traffic passing through POI device 116. In step 442** POI device copies and stores intercepted traffic which corresponds to the target, e.g., into a buffer corresponding to a direction, e.g., in this example, a buffer where the target is the source device.

In steps 444 and 446, the POI device 116 and MD device 118, are operated to communicate X2 (bi-directional) connection intercept signaling 448, e.g., control data/information, via the established mutual TLS connection between the POI device 116 and MD 118. In steps 450 and 454, the POI device 116 and MD device 118, are operated to communicate X3 (uni-directional) connection intercept content 454, e.g., intercepted traffic, via the established mutual TLS connection between the POI device 116 and MD 118. Thus, the intercepted communications are sent via a TLS encrypted tunnel.

In step 456 the MD device 118 is operated to send, via the mutual TLS connection between the MD 118, signals 458 conveying HI2 (control data/info) and HI3 (traffic) to LEMF device 128. In step 460 LEMF device 128 receives signals 458, and in step 462 the LEMF device recovers the HI2 and HI3 data/information corresponding to the intercept which is communicated in the received signals. In step 464 the LEMF device 128 processes the recovered information, e.g., optionally performing additional filtering, and sends the results of the processing to the LEA device 130.

Figure 3:
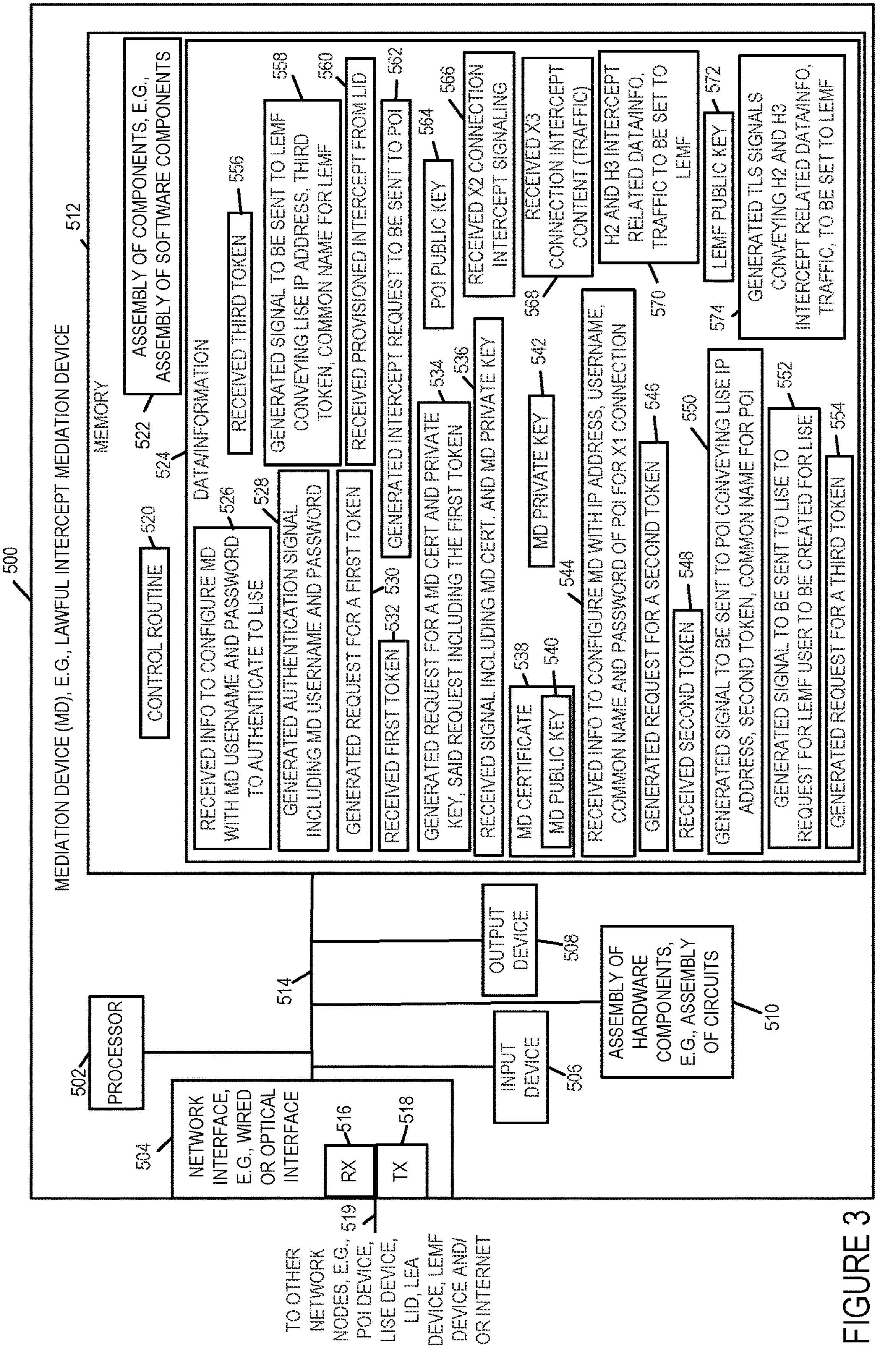
FIG. 3 is a drawing of an exemplary mediation device (MD) in accordance with an exemplary embodiment.

FIG. 3 is a drawing of an exemplary mediation device (MD) 500, e.g., a lawful interception mediation device, in accordance with an exemplary embodiment. Exemplary mediation device 500 is, e.g., mediation device 118 of system 100 of FIG. 1, and/or mediation device 118 implementing steps of the method shown in the signaling diagrams of FIG. 2. Exemplary mediation device 500 includes a processor 502, e.g., a CPU, a network interface 504, e.g., a wired or optical interface, an input device 506, e.g., a keyboard, an output device 508, e.g., a display, an assembly of hardware components 510, e.g., an assembly of circuits, and memory 512 coupled together via a bus 514 over which the various elements may interchange data and information.

Network interface 504 includes a receiver 516 and a transmitter 518, coupled to connector 519, via which the mediation device 500 may receive and send signals to other network nodes, e.g. a point of interception (POI) device, a lawful interception security engine (LISE), a lawful intercept device (LID), a law enforcement agency (LEA) device, e.g., a terminal used by a law enforcement agent, a law enforcement management facility (LEMF) device, and/or the Internet.

Memory 512 includes a control routine 520, an assembly of components 522, e.g., an assembly of software components, and data/information 524. The control routine 520 includes code, which when executed by processor 502, causes the processor to control basic MD functions, e.g., read/write memory, control the interface, control the I/O devices, etc. The assembly of software components 522, e.g., routines, subroutines, software modules, applications, etc., include code, which when executed by processor 502, control the MD 500 to perform steps of a method, e.g., steps of the method of signaling diagram 200 of FIG. 2.

Data/information 524 includes received information to configure MD 500 with a MD username and password to authenticate to LISE 526, e.g., MD username: liseadm and mdpassword, a generated authentication signal 528 including the MD username an password to be sent to the LISE, a generated request 530 for a first token, e.g. to be used in requesting a certificate and corresponding private key for the MD 500, a received first token 532, a generated request 534 for a MD certificate and private key from the LICA of the LISE, said request including the first token, a received response signal 536 including the MD certificate and corresponding private key, a stored copy of the received MD certificate 538 including a MD public key 540, a stored copy of the received MD private key 543.

Data/information 524 further includes received information 544 (received from the LID) to configure the MD 500 with an IP address, username, common name and password of POI for X1 connection, e.g. IP address=10.1.1.1, username=poiadm, common name=POI1.abc.xyz, and password=poipass, a generated request 546 for a second token, e.g. to be given to and used by the POI to request a POI certificate and corresponding private key from the LICA of the LISE, an a received second token 548, e.g., second token=1234567890, and a generated signal 550 to be sent to POI conveying LISE IP address (e.g., 10.2.2.2), the second token (e.g., 1234567890), and the common name for the POI (e.g., POI1.abc.xyz).

Data/information 524 further includes a generated signal 552 to be sent to LISE to request for LEMF user to be created for LISE, a generated request 554 for a third token, e.g. to be given to and used by the LEMF to request a LEMF certificate and corresponding private key from the LICA of the LISE, a received third token 556, a generated signa 558 to be sent to LEMF conveying LISE IP address (e.g., 10.2.2.2), the third token, and common name for LEMF.

Data/information 524 further includes a received provisioned intercept request 560 from LID, a generated intercept request 562 to be sent to a POI 562, an acquired stored POI public key 564, received X2 connection intercept signaling 566, received X3 connection intercept content (traffic) 568, H2 and H3 intercept related data/info and traffic 570 to be sent to LEMF, an acquired stored LEMF public key 572, and generated TLS signals conveying H2 and H3 intercept related data/info and traffic to be sent to LEMF.

Figure 4:
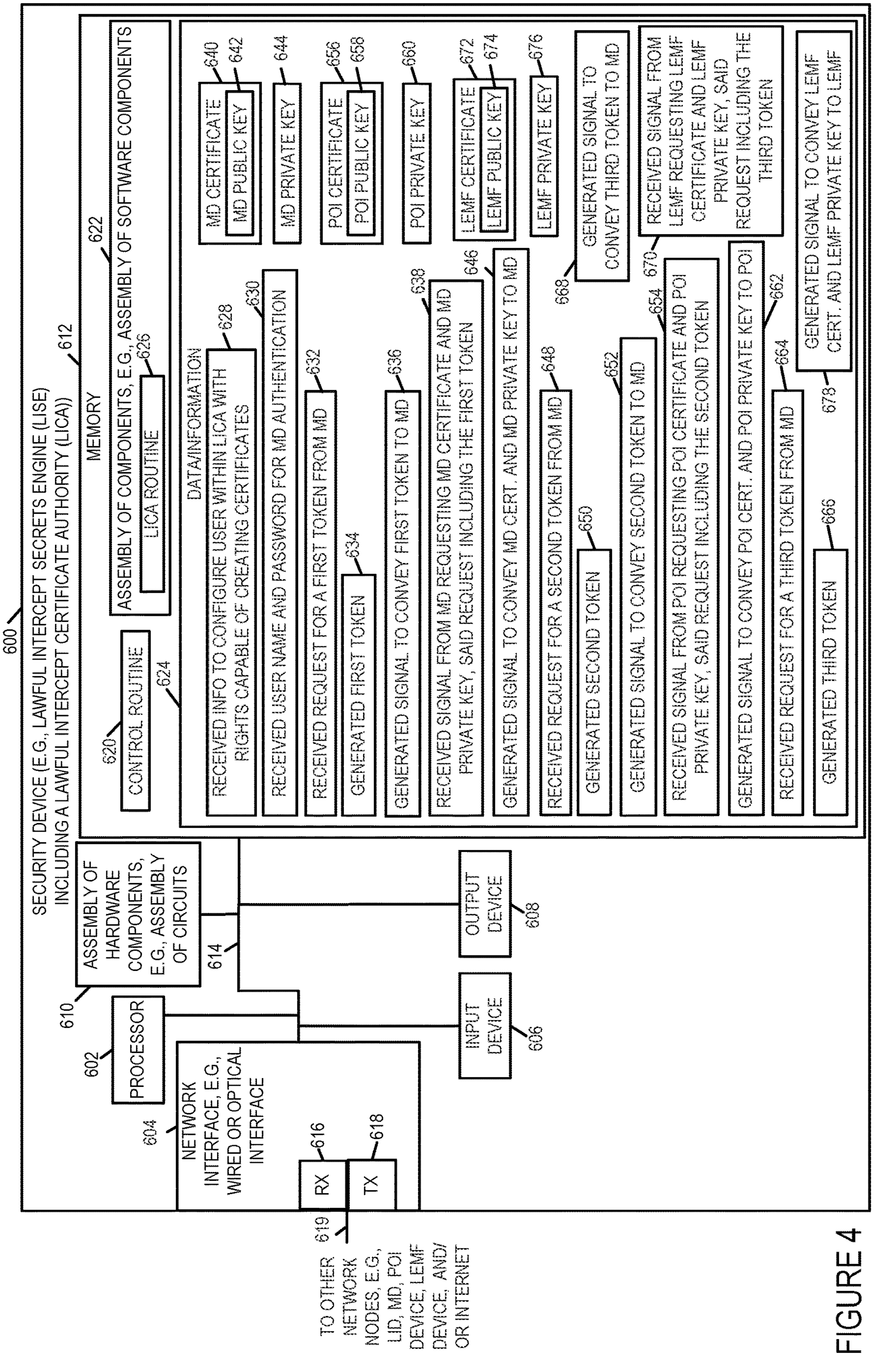
FIG. 4 is a drawing of an exemplary security device, e.g. a lawful intercept secrets engine (LISE) including a lawful intercept certificate authority (LICA) in accordance with an exemplary embodiment.

FIG. 4 is a drawing of an exemplary security device 600, e.g., a lawful intercept secrets engine (LISE) including a lawful intercept certificate authority, in accordance with an exemplary embodiment. Exemplary security device 600 is, e.g., LISE 120 of system 100 of FIG. 1 and/or LISE 120 implementing steps of the method shown in the signaling diagrams of FIG. 2. Exemplary security device 600 includes a processor 602, e.g., a CPU, a network interface 604, e.g., a wired or optical interface, an input device 606, e.g., a keyboard, an output device 608, e.g., a display, an assembly of hardware components 610, e.g., an assembly of circuits, and memory 612 coupled together via a bus 614 over which the various elements may interchange data and information.

Network interface 604 includes a receiver 616 and a transmitter 618, coupled to connector 619, via which the security device 600 may receive and send signals to other network nodes, e.g., a mediation device, a point of interception (POI) device, a legal intercept administrative device (LID), a law enforcement management facility (LEMF) device, etc.

Memory 612 includes a control routine 620, an assembly of components 622, e.g., an assembly of software components, and data/information 624. Assembly of components 622 includes a lawful interception certificate authority (LICA) routine 626. The control routine 620 includes code, which when executed by processor 602, causes the processor 602 to control basic security device 600 functions, e.g., read/write memory, control the interface, control the I/O devices, etc. The assembly of software components 622, e.g., routines, subroutines, software modules, applications, etc., include code, which when executed by processor 602, control the security device 600 to perform steps of a method, e.g., steps of the method of signaling diagram 200 of FIG. 2.

Data/information 624 includes received info to configured user withing LICA with rights capable of creating certificates 628, a received username and password for MD authentication 630, a received request for a first token from the MD 632, a generated first token 634, a generated signal 636 to convey the first token to the MD, a received signal 646 from MD requesting a MD certificate and MD private key, said request including the first token, a MD certificate 640 including a MD public key 644, a MD private key 642, wherein the MD certificate and MD private key were generated by the LICA of the LISE, and a generated signal 646 to convey the MD certificate and MD private key to the MD.

Data/information 624 further includes a received request 648 for a second token from MD, a generated second token 650, a generated signal 652 to convey the second token to the MD, a received signal 654 from POI requesting a POI certificate and POI private key, said request including the second token. Data/info 624 further includes a POI certificate 656 including a POI public key 658, a POI private key 660, wherein the POI certificate 656 and POI private key 658 were generated by the LICA of the LISE, and a generated signal 662 to convey the POI certificate and POI private key to the POI.

Data/information 624 further includes a received request 664 for a third token from MD, a generated third token 666, a generated signal 668 to convey the third token to the MD, a received signal 670 from LEMF requesting a LEMF certificate and LEMF private key, said request including the third token. Data/info 624 further includes a LEMF certificate 672 including a LEMF public key 674, a LEMF private key 676, wherein the LEMF certificate 672 and LEMF private key 676 were generated by the LICA of the LISE, and a generated signal 678 to convey the LEMF certificate and LEMF private key to the LEMF.

Figure 6:
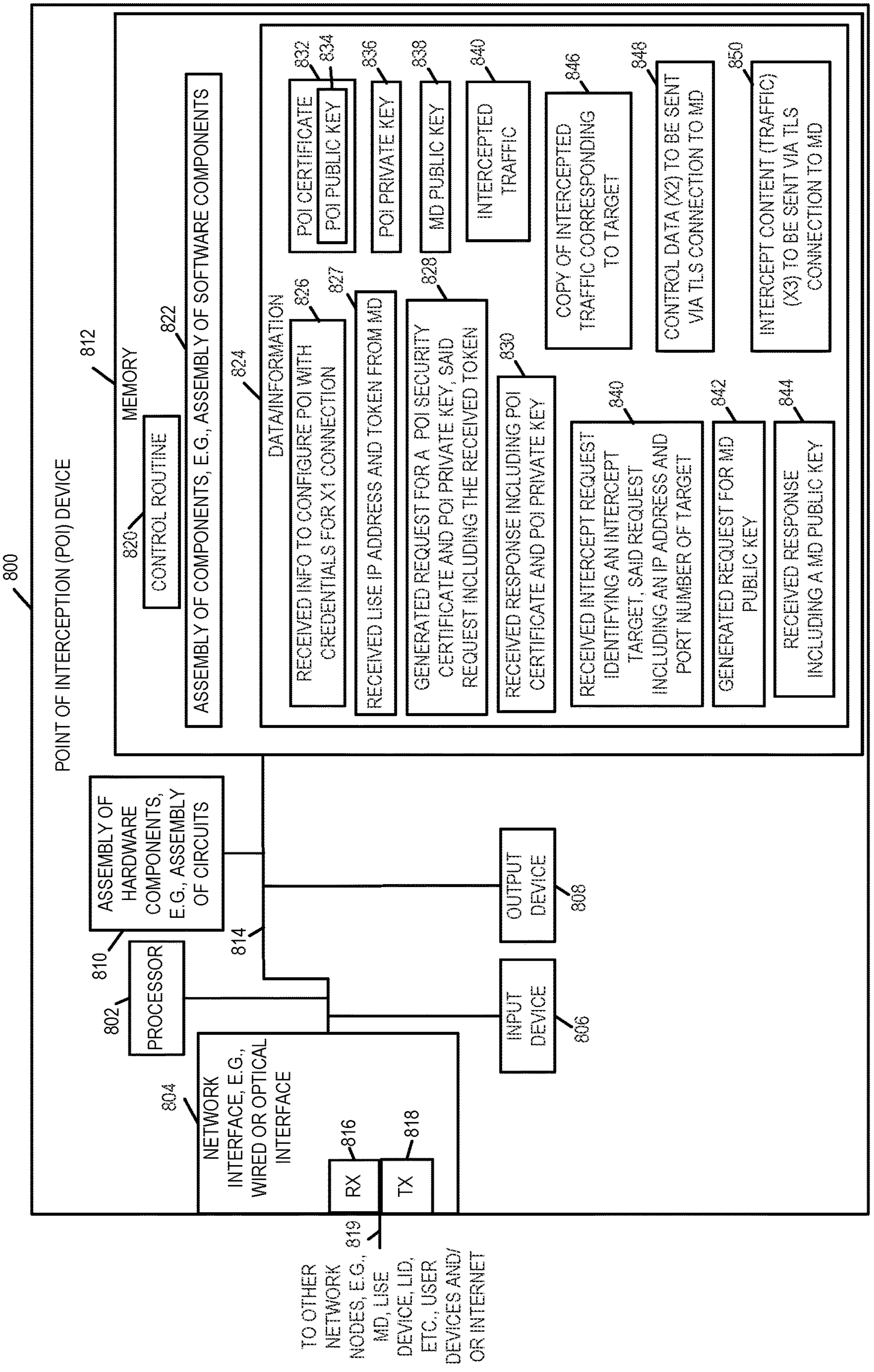
FIG. 6 is a drawing of an exemplary point of interception (POI) device, e.g. a switch, in accordance with an exemplary embodiment.

FIG. 6 is drawing of an exemplary legal intercept administrative device (LID) 700 in accordance with an exemplary embodiment. Exemplary LID 700 is, e.g., LID 124 of system 100 of FIG. 1, and/or LID 124 implementing steps of the method shown in the signaling diagrams of FIG. 2. Exemplary LID 700 includes a processor 702, e.g., a CPU, a network interface 704, e.g., a wired or optical interface, an input device 706, e.g., a keyboard, an output device 708, e.g., a display, an assembly of hardware components 710, e.g., an assembly of circuits, and memory 712 coupled together via a bus 714 over which the various elements may interchange data and information.

Network interface 704 includes a receiver 716 and a transmitter 718, coupled to connector 719, via which the LID 700 may receive and send signals to other network nodes, e g, a point of interception (POI) device, a mediation device (MD), a lawful interception security engine (LISE), a law enforcement agency (LEA) device, e.g., a terminal used by a law enforcement agent, a law enforcement management facility (LEMF) device, and/or the Internet.

Memory 712 includes a control routine 720, an assembly of components 722, e.g., an assembly of software components, and data/information 724. The control routine 720 includes code, which when executed by processor 702, causes the processor to control basic LID functions, e.g., read/write memory, control the interface, control the I/O devices, etc. The assembly of software components 722, e.g., routines, subroutines, software modules, applications, etc., include code, which when executed by processor 702, control the LID 700 to perform steps of a method, e.g., steps of the method of signaling diagram 200 of FIG. 2.

Data/information 724 includes a generated signal 726 to configure user with LICA or LISE with rights capable of creating certificates, e.g., signal sent to LISE with IP address 10.2.2.2 to create user liseadm on the LISE, wherein said liseadm will have rights capable of creating security certificates and corresponding private keys. Data/information 724 further includes a generated signal to configure a MD with a MD username and password to be used by the MD to authenticate with to LISE, a generated signal 730 to configure POI (e.g., POI1.abc.xyz) with POI credentials (e.g., a POI username and password) for X1 connection, a generated signal 732 to configure MD with a POI IP address (e.g., 10.1.1.1), a POI common name (e.g., POI1.abc.xyz), a POI user name (e.g., poiadm) and POI password (e.g., poipass) of a POI for X1 connection, a provisioned intercept request 734 to be sent to the MD for the POI FIG. 6 is a drawing of an exemplary point of interception (POI) device 800, e.g., a switch, in accordance with an exemplary embodiment. Exemplary POI device 800 is, e.g., POI device 116 of system 100 of FIG. 1, and/or POI device 116 implementing steps of the method shown in the signaling diagrams of FIG. 2. Exemplary POI device 800 includes a processor 802, e.g., a CPU, a network interface 804, e.g., a wired or optical interface, an input device 806, e.g., a keyboard, an output device 808, e.g., a display, an assembly of hardware components 810, e.g., an assembly of circuits, and memory 812 coupled together via a bus 814 over which the various elements may interchange data and information.

Network interface 804 includes a receiver 816 and a transmitter 818, coupled to connector 819, via which the POI device 800 may receive and send signals to other network nodes, e.g., a legal intercept administrative device (LID), a mediation device (MD), a lawful interception security engine (LISE), etc., user devices, and/or the Internet.

Memory 812 includes a control routine 820, an assembly of components 822, e.g., an assembly of software components, and data/information 824. The control routine 820 includes code, which when executed by processor 802, causes the processor to control basic POI device functions, e.g., read/write memory, control the interface, control the I/O devices, etc. The assembly of software components 822, e.g., routines, subroutines, software modules, applications, etc., include code, which when executed by processor 802, control the POI device 800 to perform steps of a method, e.g., steps of the method of signaling diagram 200 of FIG. 2.

Data/information 824 includes received information to configure POI with credentials for X1 connection, a received signal 827 including a LISE IP address and token (e.g., second token) from MD, a generated request 828 for a POI security certificate and POI private key, said request including the received token (e.g. the second token), a received response 803 including a POI certificate and corresponding POI private key. Data/information 824 further a stored copy of the received POI certificate 832 including a POI public key 834, a stored copy of the received POI private key 836, and a stored copy of an acquired MD public key 840.

Data/information 824 further includes a copy of intercepted traffic corresponding to a target 846, control data (X2 connection data) 848 to be sent via a TLS connection to the MD, and intercept content (traffic) (X3 connection data) to be sent via a TLS connection to the MD.

Figure 7:
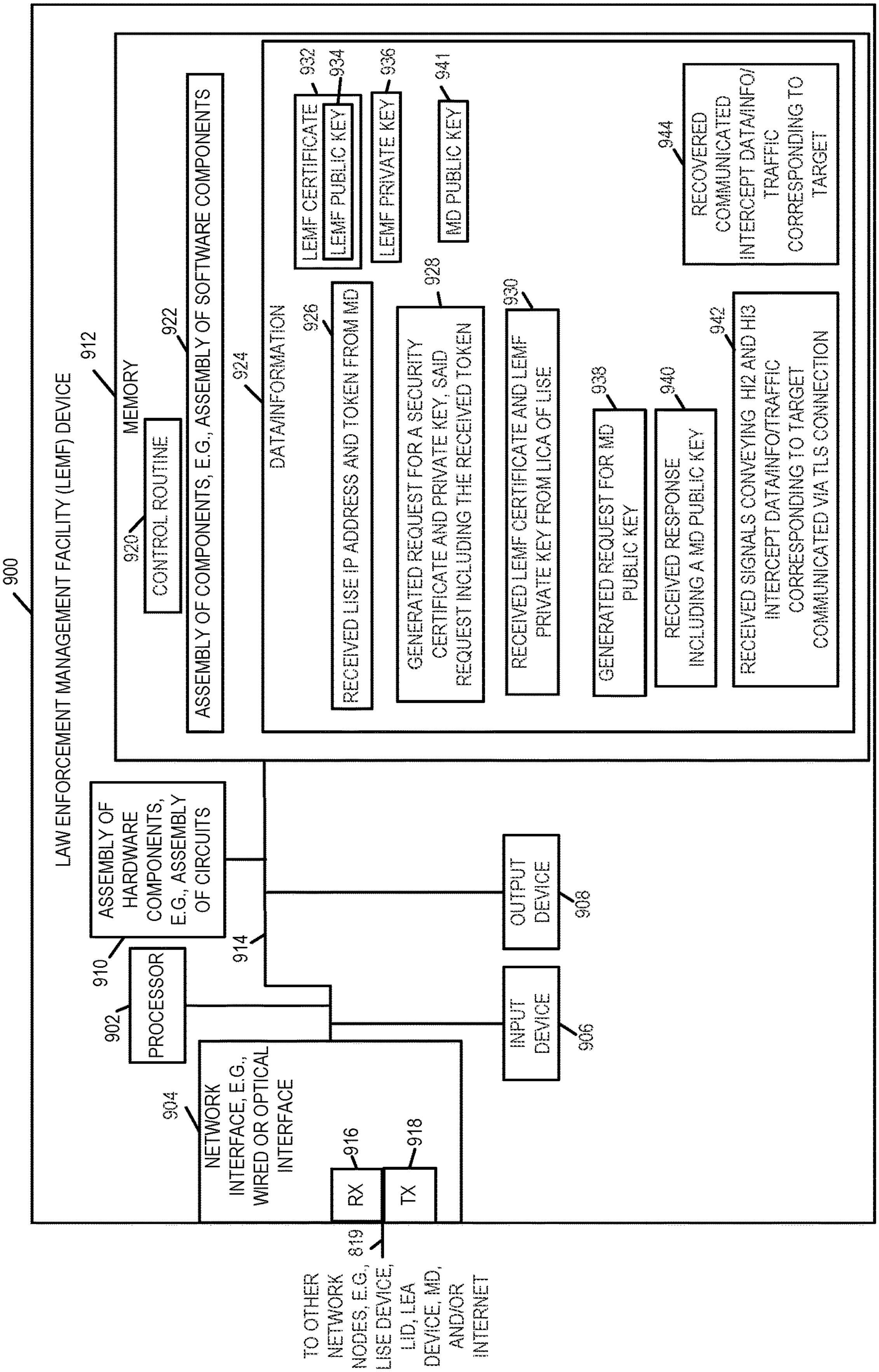
FIG. 7 is a drawing of an exemplary law enforcement management facility (LEMF) device in accordance with an exemplary embodiment.

FIG. 7 is a drawing of an exemplary law enforcement management facility (LEMF) device 900 in accordance with an exemplary embodiment. Exemplary LEMF device 900 is, e.g., LEMF device 128 of system 100 of FIG. 1, and/or LEMF device 128 implementing steps of the method shown in the signaling diagrams of FIG. 2. Exemplary LEMF device 900 includes a processor 902, e.g., a CPU, a network interface 904, e.g., a wired or optical interface, an input device 906, e.g., a keyboard, an output device 908, e.g., a display, an assembly of hardware components 910, e.g., an assembly of circuits, and memory 912 coupled together via a bus 914 over which the various elements may interchange data and information.

Network interface 904 includes a receiver 916 and a transmitter 918, coupled to connector 919, via which the LEMF device 900 may receive and send signals to other network nodes, e.g., a legal intercept administrative device (LID), a mediation device (MD), a lawful interception security engine (LISE), a law enforcement agency (LEA) device, etc., and/or the Internet.

Memory 912 includes a control routine 920, an assembly of components 922, e.g., an assembly of software components, and data/information 924. The control routine 920 includes code, which when executed by processor 902, causes the processor to control basic LEMF device functions, e.g., read/write memory, control the interface, control the I/O devices, etc. The assembly of software components 922, e.g., routines, subroutines, software modules, applications, etc., include code, which when executed by processor 902, control the LEMF device 900 to perform steps of a method, e.g., steps of the method of signaling diagram 200 of FIG. 2.

Data/information 924 includes a received signal 926 including a received LISE IP address and a token (e.g., third token) from MD, a generated request 928 for a LEMF security certificate and corresponding LEMF private key, said request including the received token (e.g. third token), a generated request 938 for a MD public key, a received response 940 including a MD public key, a stored copy of the received LEMF certificate 932 including a LEMF public key 934, a stored copy of the received LEMF private key 936, and stored copy of the received MD public key 941. Data/information 924 further includes received TLS signals 942 conveying HI2 data (control data and metadata relating to intercept) and HI3 data (intercepted content, e.g., intercepted traffic) corresponding to the target, and recovered 944 communicated intercepted data/info/traffic corresponding to the target.

Figure 8A:
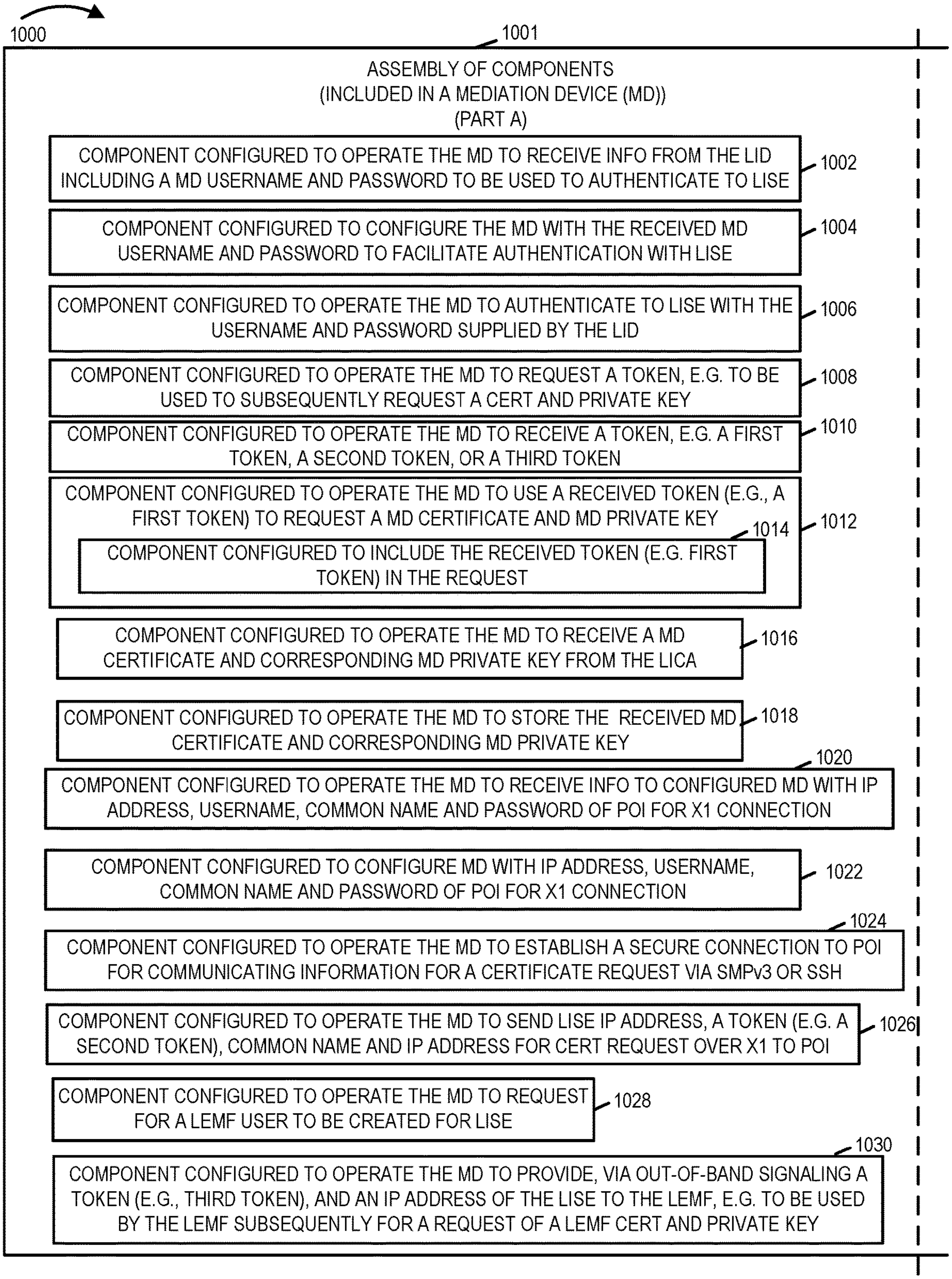
FIG. 8A is a drawing of a first part of an exemplary assembly of components which may be included in a mediation device in accordance with an exemplary embodiment.
Figure 8B:
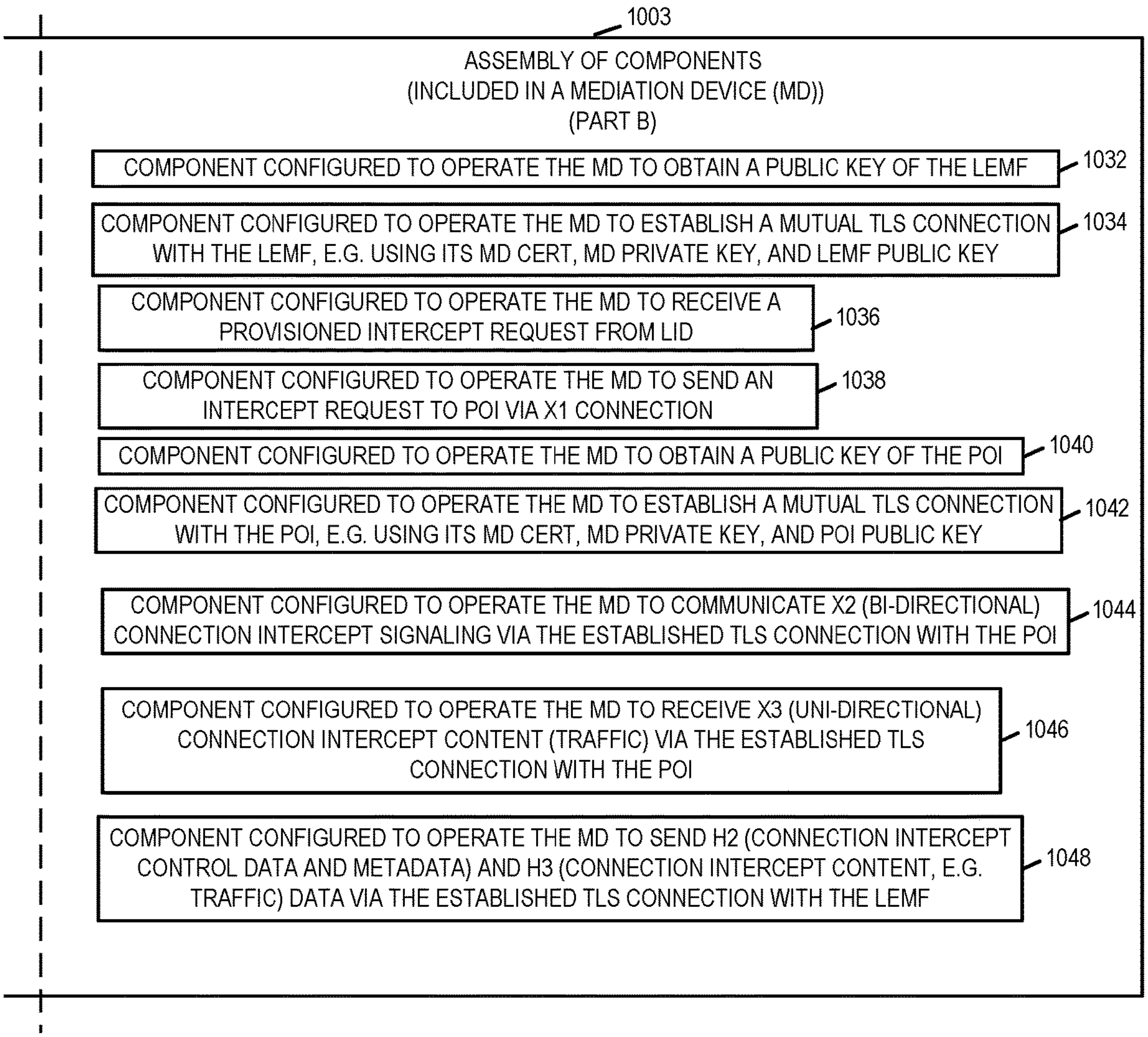
FIG. 8B is a drawing of a second part of an exemplary assembly of components which may be included in a mediation device in accordance with an exemplary embodiment.
Figure 8:
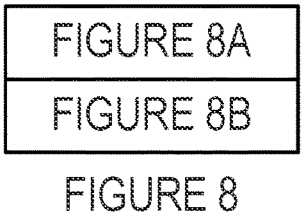
FIG. 8 comprises the combination of FIG. 8A and FIG. 8B.

FIG. 8, comprising the combination of FIG. 8A and FIG. 8B, is a drawing of an exemplary assembly of components 1000, comprising the combination of Part A 1001 and Part B 1003, which may be included in a mediation device, e.g., mediation device 118 of FIGS. 1 and 2 and/or mediation device 500 of FIG. 3, in accordance with an exemplary embodiment.

The components in the assembly of components 1000 can, and in some embodiments are, implemented fully in hardware within a processor, e.g., processor 502, e.g., as individual circuits. The components in the assembly of components 1000 can, and in some embodiments are, implemented fully in hardware within the assembly of hardware components 510, e.g., as individual circuits corresponding to the different components. In other embodiments some of the components are implemented, e.g., as circuits, within processor 502 with other components being implemented, e.g., as circuits within assembly of components 510, external to and coupled to the processor 502. As should be appreciated the level of integration of components on the processor and/or with some components being external to the processor may be one of design choice. Alternatively, rather than being implemented as circuits, all or some of the components may be implemented in software and stored in the memory 512 of the mediation device 500, with the components controlling operation of mediation device 500 to implement the functions corresponding to the components when the components are executed by a processor e.g., processor 502. In some such embodiments, the assembly of components 1000 is included in the memory 512 as part of an assembly of software components 522. In still other embodiments, various components in assembly of components 1000 are implemented as a combination of hardware and software, e.g., with another circuit external to the processor providing input to the processor which then under software control operates to perform a portion of a component's function.

When implemented in software the components include code, which when executed by a processor, e.g., processor 502, configure the processor to implement the function corresponding to the component. In embodiments where the assembly of components 1000 is stored in the memory 512, the memory 512 is a computer program product comprising a computer readable medium comprising code, e.g., individual code for each component, for causing at least one computer, e.g., processor 502, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the mediation device 500 or elements therein such as the processor 502, to perform the functions of corresponding steps illustrated and/or described in the method of one or more of the flowcharts, signaling diagrams and/or described with respect to any of the Figures. Thus, the assembly of components 1000 includes various components that perform functions of corresponding one or more described and/or illustrated steps of an exemplary method, e.g., steps of the method of signaling diagram 200 of FIG. 2.

Assembly of components 1000 includes a component 1002 configured to operate the MD to receive information from the LID including a MD username and password to be used to authenticate to the LISE, a component 1004 configured to configured the MD with the received MD username and password to facilitate authentication to LISE, a component 1006 configured to operate the MD to authenticate to LISE with the username and password supplied by the LID, a component 1008 configured to operate the MD to request a token, a component 1010 configured to operate the MD to receive a token, and a component configured to operate the MD to use a received token (e.g., a first token), to request a MD certificate and a MD private key, e.g. send a request for a MD certificate and corresponding private key to a LICA included in a LISE. Component 1012 includes a component 1014 configured to include the received token (e.g., the first token) in the request. Assembly of components 1000 further includes a component 1016 configured to operate the MD to receive a MD certificate and corresponding MD private key from the LICA, and a component 1018 configured to operate the MD to store the received MD certificate and corresponding MD private key.

Assembly of components 1000 further includes a component 102) configured to operate the MD to receive information to configure MD with an IP address, username, common name, and password of a POI for X1 connection, a component 1022 configured to configure the MED with received IP address, username, common name, and password of the POI for X1 connection, a component 1024 configured to operate the MD to establish a secure connection to the POI for communicating information for a certificate request via SMPv3 or SSH, a component 1026 configured to operate the MD to send LISE IP address, a token (e.g., a second token), common name and IP address for certificate request over X1 to the POI, a component 1028 configured to operate the MD to request for a LEMF user to be created for LISE, and a component 1030 configured to operate the MD to provide, via out-of-band signaling a token (e.g., a third token) and an IP address of the USE to the LEMF, e g, to be used by the LEMF subsequently for a request of a LEMF certificate and corresponding LEMF private key.

Assembly of components 1000 further includes a component 1032 configured to operate the MD to obtain a public key of the LEMF, a component 1034 configured to operate the MD to establish a mutual TLS connection with the LEMF, e.g. using its MD certificate, MD private key, and LEMF public key, a component 1036 configured to operate the MD to receive a provisioned intercept request from LID, a component 1038 configured to operate the MD to send an intercept request to POI via X1 connection, and a component 1040 configured to operate the MD to obtain a public key of the POI.

Assembly of components 1000 further includes a component 1042 configured to operate the MD to establish a mutual TLS connection with the POI, e g, using its MD certificate, MD private key, and POI public key, a component 1044 configured to operate the MD to communicate X2 (bi-directional) connection intercept signaling via the established TLS connection with the POI, a component 1046 configured to operate the MD to receive (uni-directional) connection intercept content (traffic) via the established TLS connection with the POI, and a component 1048 configured to operate the MD to send H2 (connection intercept control data and metadata) and H3 (connection intercept content, e.g. traffic) data via the established TLS connection with the LEMF.

Figure 9:
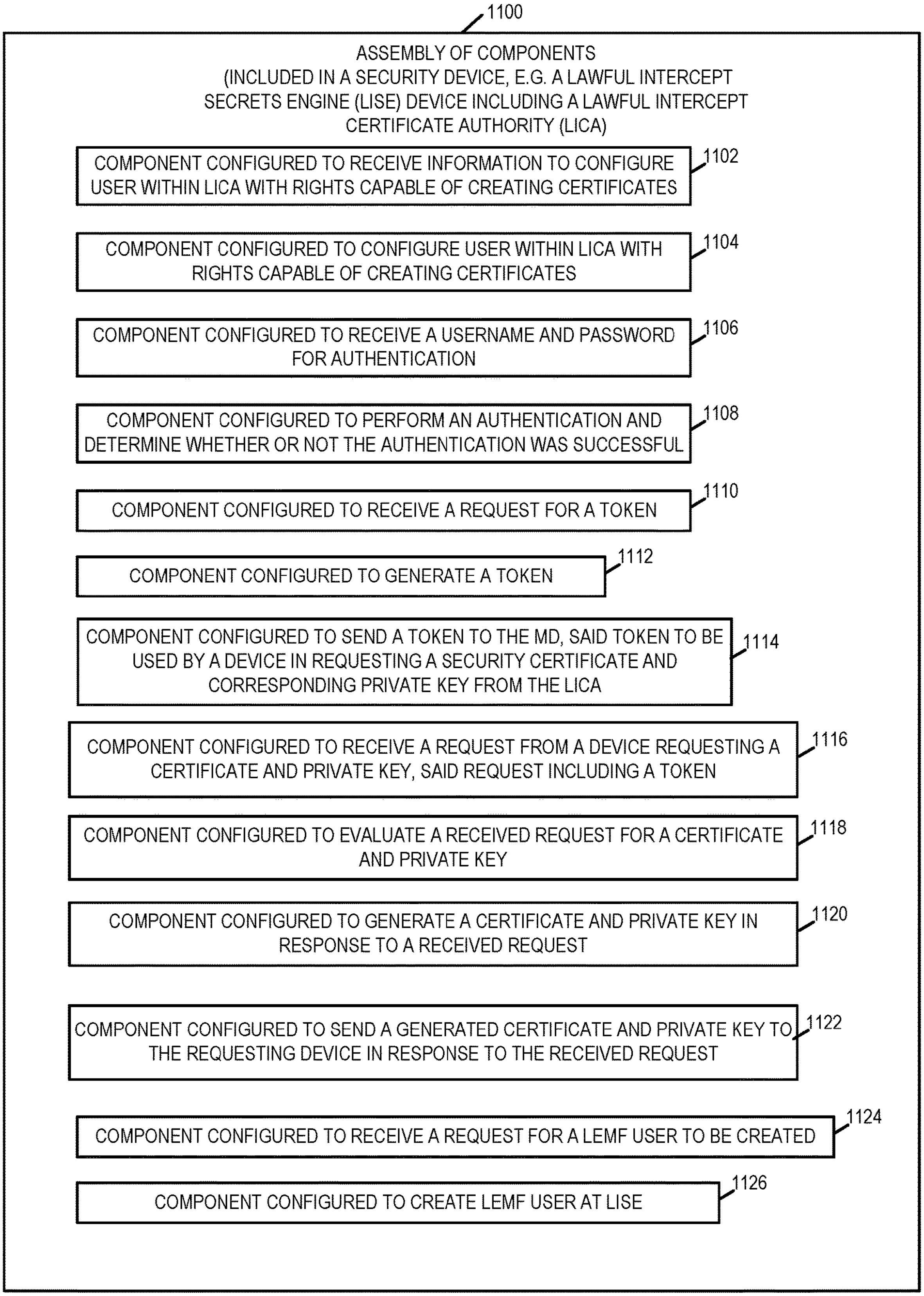
FIG. 9 is a drawing of an exemplary assembly of components which may be included in a security device, e.g., a lawful intercept secrets engine (LISE) device including a lawful intercept certificate authority (LICA) in accordance with an exemplary embodiment.

FIG. 9 is a drawing of an exemplary assembly of components 1100 which may be included in a security device, e.g., a lawful intercept secrets engine (LISE) device including a lawful intercept certificate authority (LICA), e.g., LISE 120 including LICA 121 of FIGS. 1 and 2 and/or LISE 600 of FIG. 4, in accordance with an exemplary embodiment.

The components in the assembly of components 1100 can, and in some embodiments are, implemented fully in hardware within a processor, e.g., processor 502, e.g., as individual circuits. The components in the assembly of components 1100 can, and in some embodiments are, implemented fully in hardware within the assembly of hardware components 610, e.g., as individual circuits corresponding to the different components In other embodiments some of the components are implemented, e.g., as circuits, within processor 602 with other components being implemented, e.g., as circuits within assembly of components 610, external to and coupled to the processor 602. As should be appreciated the level of integration of components on the processor and/or with some components being external to the processor may be one of design choice. Alternatively, rather than being implemented as circuits, all or some of the components may be implemented in software and stored in the memory 612 of the security device 600, e.g., LISE including a LICA, with the components controlling operation of security device 600 to implement the functions corresponding to the components when the components are executed by a processor e.g., processor 602. In some such embodiments, the assembly of components 1100 is included in the memory 612 as part of an assembly of software components 622. In still other embodiments, various components in assembly of components 1100 are implemented as a combination of hardware and software, e.g., with another circuit external to the processor providing input to the processor which then under software control operates to perform a portion of a component's function.

When implemented in software the components include code, which when executed by a processor, e.g., processor 602, configure the processor to implement the function corresponding to the component. In embodiments where the assembly of components 1100 is stored in the memory 612, the memory 612 is a computer program product comprising a computer readable medium comprising code, e.g., individual code for each component, for causing at least one computer, e.g., processor 602, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 9 control and/or configure the security device 600, e.g., a LISE including a LICA, or elements therein such as the processor 602, to perform the functions of corresponding steps illustrated and/or described in the method of one or more of the flowcharts, signaling diagrams and/or described with respect to any of the Figures. Thus, the assembly of components 1100 includes various components that perform functions of corresponding one or more described and/or illustrated steps of an exemplary method, e.g., steps of the method of signaling diagram 200 of FIG. 2.

Assembly of components 1100 includes a component 1102 configured to receive information to configure user within LICA with rights capable of creating certificates, a component 1104 configured to configure user within LICA with rights capable of creating certificates based on the received information, a component 1106 configured to receive a username and password for authentication, a component 1108 configured to perform an authentication operation and determine whether or not the authentication was successful, a component 1110 configured to receive a request for a token 1110, a component 1112 configured to generate a token, and a component 1114 configured to send a generated token to the MD, said token to be used by a device in requesting a security certificate and corresponding private key. Assembly of components 1100 further includes a component 1116 configured to receive a request from a device requesting a certificate and private key, said request including a token, a component 1118 configured to evaluate a received request for a certificate and private key and determine whether or not the request is approved, a component 1 120 configured to generate a certificate and private key in response to a received request which has been approved, a component 1122 configured to send a generated certificate and private key to the requesting device in response to the received request, a component 1124 configured to receive a request for a LEMF user to be created, and a component 1126 configured to create a LEMF user at the LISE.

Figure 5:
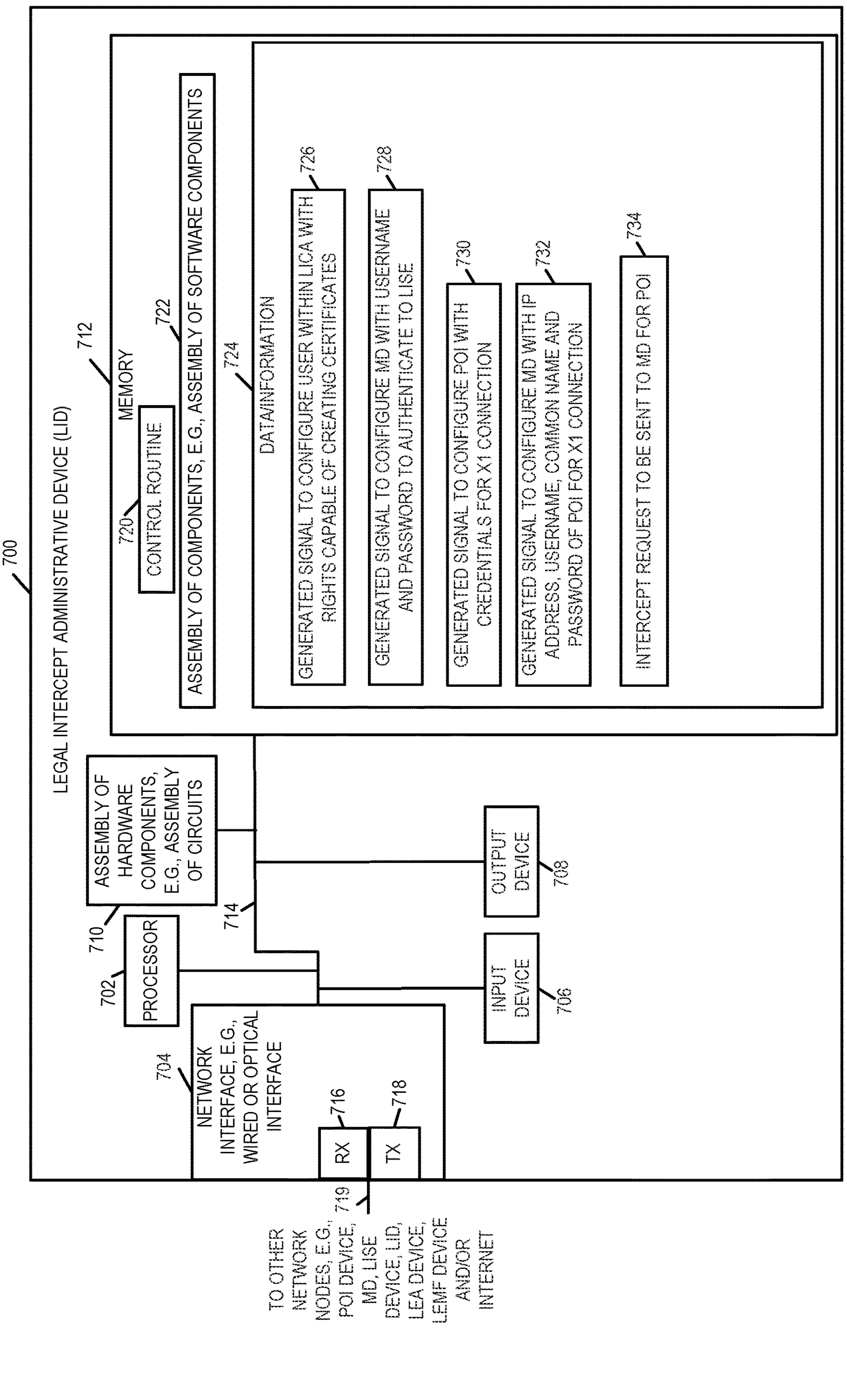
FIG. 5 is drawing of an exemplary legal intercept administrative device (LID) in accordance with an exemplary embodiment.
Figure 10:
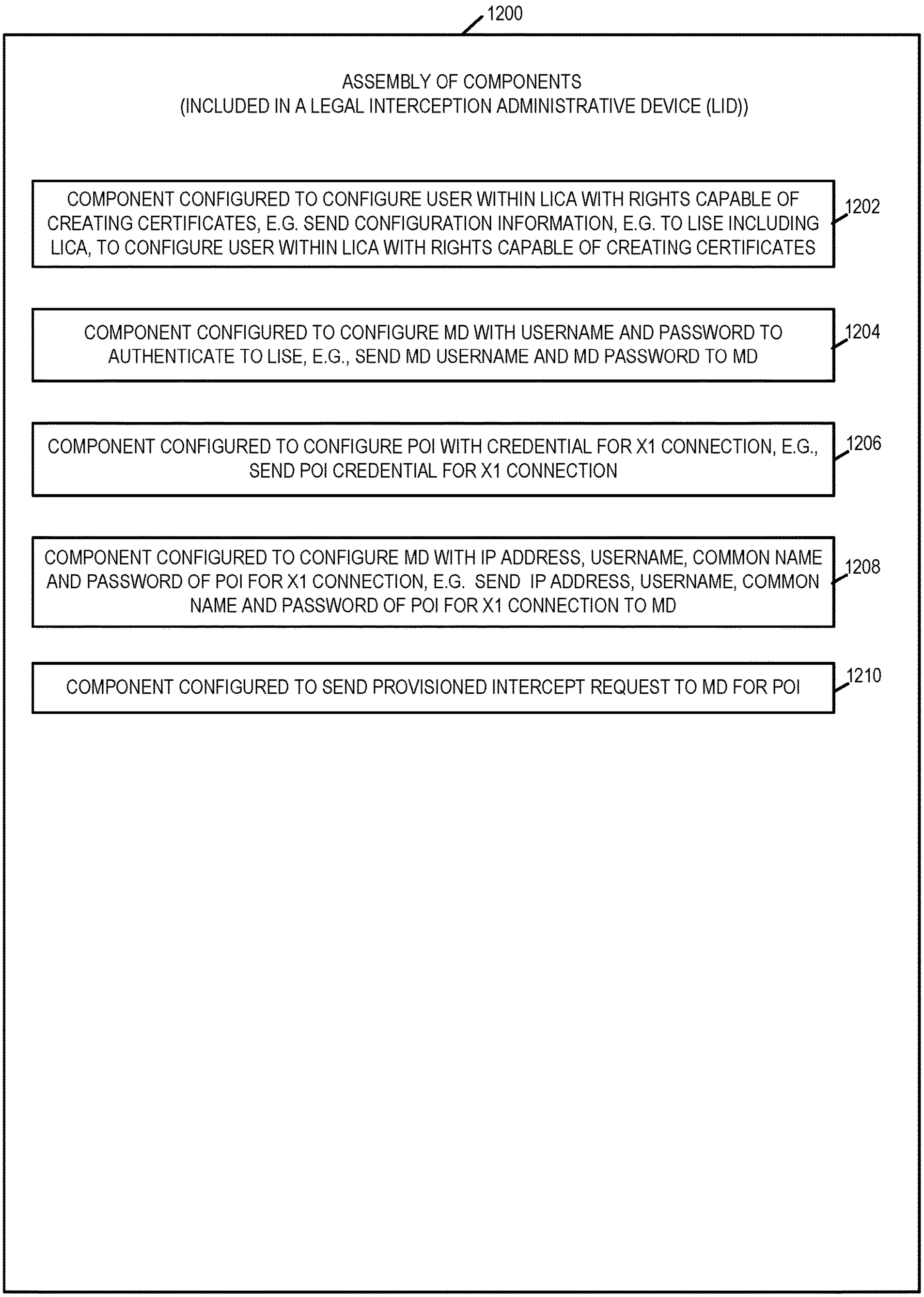
FIG. 10 is a drawing of an exemplary assembly of components which may be included in a legal interception administrative device (LID) in accordance with an exemplary embodiment.

FIG. 10 is a drawing of an exemplary assembly of components 1200 which may be included in a legal interception administrative device (LID), e.g., LID 124 of FIGS. 1 and 2 and/or LID 700 of FIG. 5, in accordance with an exemplary embodiment.

The components in the assembly of components 1200 can, and in some embodiments are, implemented fully in hardware within a processor, e.g., processor 702, e.g., as individual circuits. The components in the assembly of components 1200 can, and in some embodiments are, implemented fully in hardware within the assembly of hardware components 710, e.g., as individual circuits corresponding to the different components. In other embodiments some of the components are implemented, e.g., as circuits, within processor 702 with other components being implemented, e.g., as circuits within assembly of components 710, external to and coupled to the processor 702. As should be appreciated the level of integration of components on the processor and/or with some components being external to the processor may be one of design choice. Alternatively, rather than being implemented as circuits, all or some of the components may be implemented in software and stored in the memory 712 of the legal intercept administrative device (LID) 700, with the components controlling operation of the LID 700 to implement the functions corresponding to the components when the components are executed by a processor e.g., processor 702. In some such embodiments, the assembly of components 1200 is included in the memory 712 as part of an assembly of software components 722. In still other embodiments, various components in assembly of components 1200 are implemented as a combination of hardware and software, e.g., with another circuit external to the processor providing input to the processor which then under software control operates to perform a portion of a component's function.

When implemented in software the components include code, which when executed by a processor, e.g., processor 702, configure the processor to implement the function corresponding to the component. In embodiments where the assembly of components 1200 is stored in the memory 712, the memory 712 is a computer program product comprising a computer readable medium comprising code, e.g., individual code for each component, for causing at least one computer, e.g., processor 502, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 10 control and/or configure the legal intercept administrative device (LID) 700 or elements therein such as the processor 702, to perform the functions of corresponding steps illustrated and/or described in the method of one or more of the flowcharts, signaling diagrams and/or described with respect to any of the Figures. Thus, the assembly of components 1200 includes various components that perform functions of corresponding one or more described and/or illustrated steps of an exemplary method, e.g., steps of the method of signaling diagram 200 of FIG. 2.

Assembly of components 1200 includes a component 1202 configured to configure user within LICA with rights capable of creating certificates, e.g. send configuration information, e.g. to a LISE including a LICA, to configure user within LICA with rights capable of creating certificates, a component 1204 configured to configure a MD with a username and password to authenticate to LISE, e.g., send a MD username and a MD password to the MD, a component 1206 configured to configured a POI with credentials for X1 connection, e.g. send POI credential for X1 connection to a POI, a component 1208 configured to configured a MD with an IP address, username, common name and password of a POI for X1 connection, e.g. send IP address, username, common name and password of POI for X1 connection to MD, and a component configured to send a provisioned intercept request to a MI) for a POI.

Figure 11:
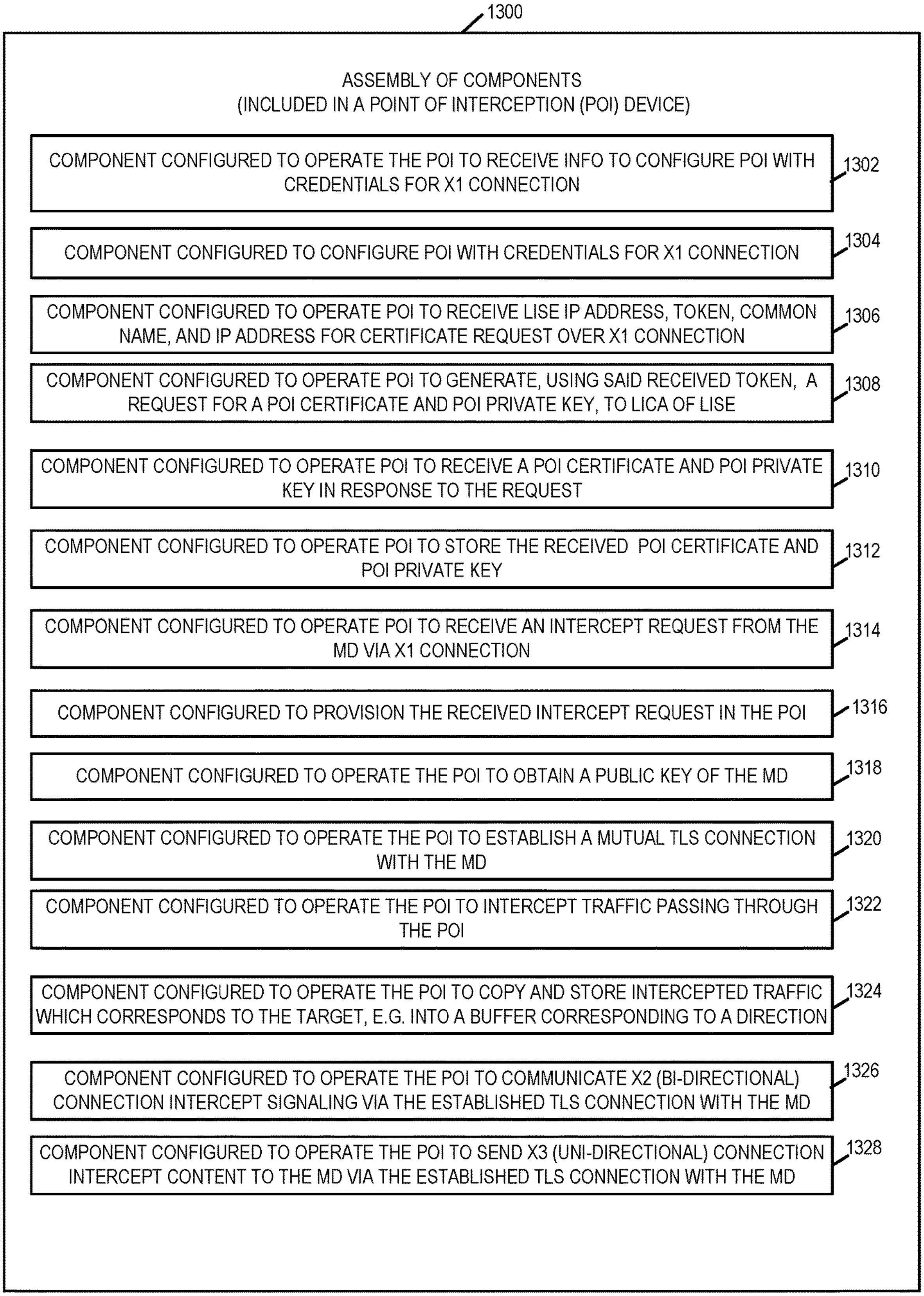
FIG. 11 is a drawing of an exemplary assembly of components which may be included in a point of interception (POI) device in accordance with an exemplary embodiment.

FIG. 11 is a drawing of an exemplary assembly of components 1300 which may be included in a point of interception (POI) device, e.g., POI device 116 of FIGS. 1 and 2 and/or POI device 800 of FIG. 6, in accordance with an exemplary embodiment.

The components 1300 in the assembly of components 1300 can, and in some embodiments are, implemented fully in hardware within a processor, e.g., processor 802, e.g., as individual circuits. The components in the assembly of components 1300 can, and in some embodiments are, implemented fully in hardware within the assembly of hardware components 810, e.g., as individual circuits corresponding to the different components. In other embodiments some of the components are implemented, e.g., as circuits, within processor 802 with other components being implemented, e.g., as circuits within assembly of components 810, external to and coupled to the processor 802. As should be appreciated the level of integration of components on the processor and/or with some components being external to the processor may be one of design choice. Alternatively, rather than being implemented as circuits, all or some of the components may be implemented in software and stored in the memory 812 of the point of interception (POI) device 800, with the components controlling operation of POI device 800 to implement the functions corresponding to the components when the components are executed by a processor e.g., processor 802. In some such embodiments, the assembly of components 1300 is included in the memory 812 as part of an assembly of software components 822. In still other embodiments, various components in assembly of components 1300 are implemented as a combination of hardware and software, e.g., with another circuit external to the processor providing input to the processor which then under software control operates to perform a portion of a component's function.

When implemented in software the components include code, which when executed by a processor, e.g., processor 802, configure the processor to implement the function corresponding to the component. In embodiments where the assembly of components 1300 is stored in the memory 812, the memory 812 is a computer program product comprising a computer readable medium comprising code. e.g., individual code for each component, for causing at least one computer, e.g., processor 802, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 11 control and/or configure the POI device 800 or elements therein such as the processor 802, to perform the functions of corresponding steps illustrated and/or described in the method of one or more of the flowcharts, signaling diagrams and/or described with respect to any of the Figures. Thus, the assembly of components 1300 includes various components that perform functions of corresponding one or more described and/or illustrated steps of an exemplary method, e.g., steps of the method of signaling diagram 200 of FIG. 2.

Assembly of components 1300 includes a component 1302 configured to operate the POI to receive information to configured the POI with credentials for X1 connection, a component 1304 configured to configured the POI with credentials for X1 connection, a component 1306 configured to operate the POI to receive a LISE IP address, token, common name and IP address for certificate request over X1 connection, a component 1308 configured to operate the POI to generate, using said received token, a request for a POI certificate and corresponding POI private key, to LICA of LISE, a component 1310 configured to operate the POI to receive a POI certificate and POI private key in response to the request, and a component 1312 configured to operate the POI to store the received POI certificate and POI private key. Assembly of components 1300 further includes a component 1314 configured to operate the POI to receive an intercept request from the MD via X1 connection, a component 1316 configured to provision the received intercept request in the POI, a component 1318 configured to operate the POI to obtain a public key of the MD, a component 1320 configured to operate the POI to establish a mutual TLS connection with the MD, a component 1322 configured to operate the POI to intercept traffic passing through the POL, a component 1324 configured to operate the POI to copy and store intercepted traffic which corresponds to the target, e.g., into a buffer corresponding to a direction, a component 1326 configured to operate the POI to communicate X3 (bi-directional) connection intercept signaling via the established TLS connection with the MD, and a component 1328 configured to operate the POI to send X3 (uni-directional) connection intercept content to the MD via the established TLS connection with the MD.

Figure 12:
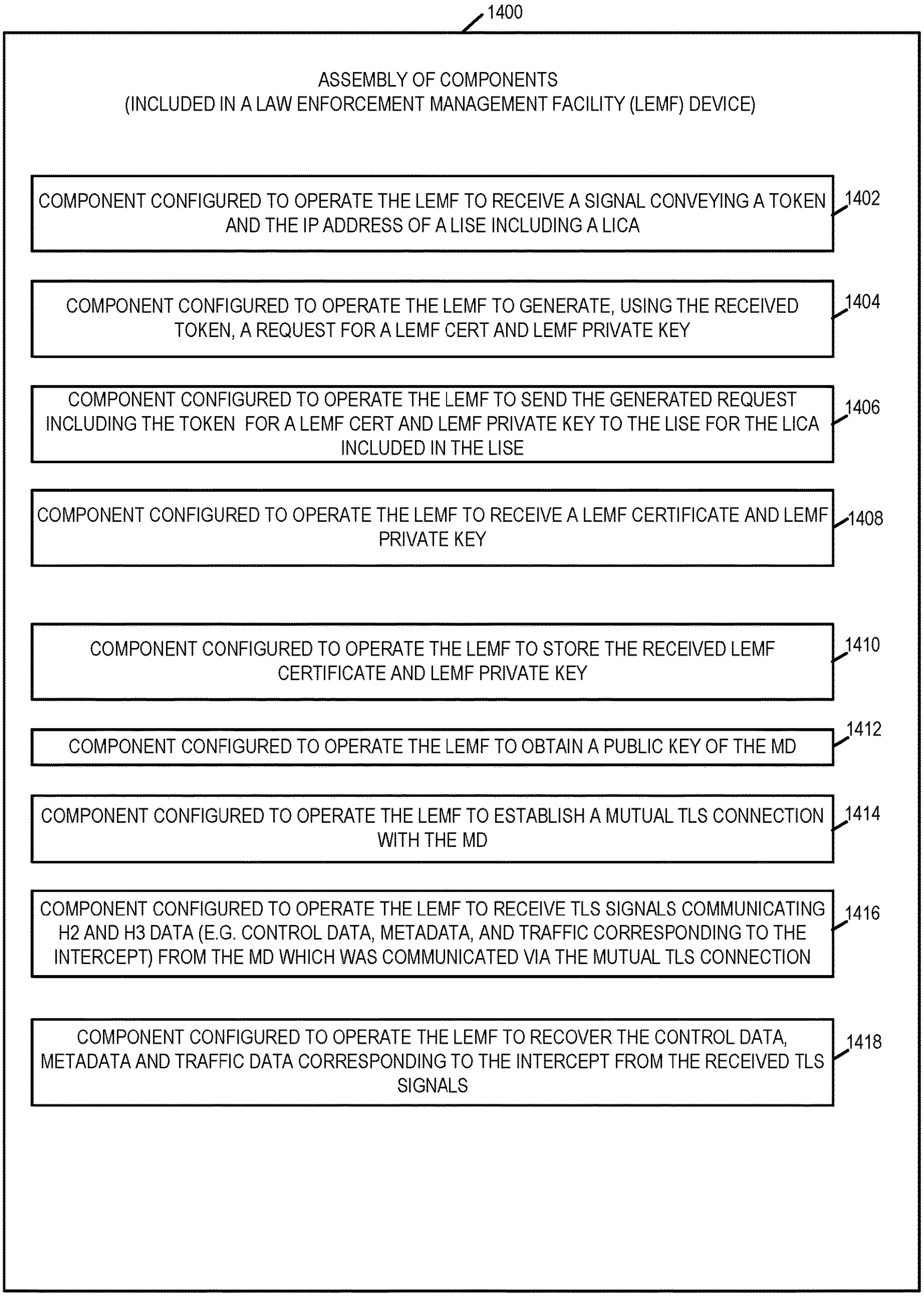
FIG. 12 is a drawing of an exemplary assembly of components which may be included in a law enforcement management facility (LEMF) device in accordance with an exemplary embodiment.

FIG. 12 is a drawing of an exemplary assembly of components 1400 which may be included in a law enforcement management facility (LEMF) device, e.g., LEMF device 128 of FIGS. 1 and 2 and/or LEMF device 900 of FIG. 7 in accordance with an exemplary embodiment.

The components in the assembly of components 1400 can, and in some embodiments are, implemented fully in hardware within a processor, e.g., processor 902, e.g., as individual circuits. The components in the assembly of components 1000 can, and in some embodiments are, implemented fully in hardware within the assembly of hardware components 910, e.g., as individual circuits corresponding to the different components. In other embodiments some of the components are implemented, e.g., as circuits, within processor 902 with other components being implemented, e.g., as circuits within assembly of components 910, external to and coupled to the processor 902. As should be appreciated the level of integration of components on the processor and/or with some components being external to the processor may be one of design choice. Alternatively, rather than being implemented as circuits, all or some of the components may be implemented in software and stored in the memory 912 of the LEMF device 900, with the components controlling operation of LEMF device 900 to implement the functions corresponding to the components when the components are executed by a processor e.g., processor 902. In some such embodiments, the assembly of components 1400 is included in the memory 912 as part of an assembly of software components 922. In still other embodiments, various components in assembly of components 1400 are implemented as a combination of hardware and software, e.g., with another circuit external to the processor providing input to the processor which then under software control operates to perform a portion of a component's function.

When implemented in software the components include code, which when executed by a processor, e.g., processor 902, configure the processor to implement the function corresponding to the component. In embodiments where the assembly of components 1400 is stored in the memory 912, the memory 912 is a computer program product comprising a computer readable medium comprising code, e.g., individual code for each component, for causing at least one computer, e.g., processor 902, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 12 control and/or configure the LEMF device 900 or elements therein such as the processor 902, to perform the functions of corresponding steps illustrated and/or described in the method of one or more of the flowcharts, signaling diagrams and/or described with respect to any of the Figures. Thus, the assembly of components 1400 includes various components that perform functions of corresponding one or more described and/or illustrated steps of an exemplary method, e.g., steps of the method of signaling diagram 200 of FIG. 2.

Assembly of components 1400 includes a component 1402 configured to operate the LEMF to receive a signal conveying a token and an IP address of a LISE including a LICA, a component 1404 configured to operate the LEMF to generate, using the received token, a request for a LEMF certificate and LEMF private key, and a component 1406 configured to operate the LEMF to send the generated request for a LEMF certificate and LEMF private key to the LISE for the LICA including in the LISE, said request in the received token, a component 1408 configured to operate the LEMF to receive a LEMF certificate and LEMF private key in response to the request, a component 1410 configured to operate the LEMF to store the received LEMF certificate and LEMF private key. Assembly of components 1400 further includes a component 1412 configured to operate the LEMF to obtain a public key of the MD, a component 1414 configured to operate the LEMF to establish a mutual TLS connection with the MD, a component 1416 configured to operate the LEMF to receive TLS signals communicating H2 data (e.g., control data and metadata corresponding to the intercept) and H3 data (e.g., content, e.g. traffic corresponding to the intercept) from the MD which was communicated via the mutual TLS connection between the MD and LEMF, and a component 1418 configured to operate the LEMF to recover the control data, metadata, and traffic data corresponding to the intercept from the received TLS signals. e.g. using the LEMF private key.

Various aspects and/or features of some, but not necessarily all, embodiments of the present invention are described below.

Based on a desired intercept request to be implemented, a Lawful Interception (LI) administration (admin) device (LID) identifies at least a first mediation device (MD), e.g., a lawful interception mediation device, and point of intercept (POI) device which will be involved in implementing the intercept request. The LI administrator then proceeds to enable the use of a private certificate authority to automatically generate and provision the MD and POI with certificates and private keys via an X1 connection, e.g., the MD and POI are each provisioned with a private/public key pair that can be used to support mutual TLS for intercept related communications between the POI and MD, e.g., on X2 and X3 connections between these devices. The X1 connection (bi-directional) is for encrypted intercept provisioning between the MD and the POI. The X2 connection (bi-directional) is for intercept signaling (e.g., control data/info, metadata, etc.) between the POI to the MD. The X3 connection (uni-directional) is for intercept content (e.g., traffic) from the POI to the MD.

Automated methods and apparatus for providing an LISE (Lawful Intercept Secrets Engine) to issue tokens to an authorized user, e.g., device such as the MD, so that certificates can be requested from a private certificate authority such as a Lawful Intercept Certificate Authority (LICA) within the LISE for use in securing intercept related communication between devices are described.

The MD uses the username and password configured on the LISE to request a first token which is then used to obtain a first certificate (first public key and first certificate identifier) along with a corresponding first private key for securing communication between the MD and POI. The MD subsequently uses its user name and password to request a second token which is then supplied to the POI. The POI then uses the second token to request a certificate and corresponding private key for the POI from the LICA. The LICA provides the POI the second certificate including a second public key and certificate identifier along with a second private key corresponding to the second public key. The MD uses its private key (the first private key) to authenticate to the POI and uses the POI's public key, which is publicly available, e.g., from the certificate authority, to encrypt communications to the POI sent over the X2 and X3 connections.

The POI uses its private key. i.e., the second private key, to authenticate to the MD and uses the MD's public key which is publicly available, e.g., from the certificate authority, to encrypt communications to the MD sent over the X2 and X3 connections.

By using a private certificate authority incorporated into the LISE in combination with provisioning of a user name and password corresponding to an entity authorized to obtain tokens which can be used to request certificates, communications between an MD and POI can be established in a secure manner based on automatic provisioning by an LI admin device having a secure communications link with the LISE without the need for individual human involvement in setting up the certificates on devices.

Various additional aspects and/or features of some, but not necessarily all, embodiments of the present invention are described below.

The provisioning of an intercept between a Mediation Device (MD), e.g., a lawful interception mediation device, and the Point of Intercept (POI) device, e.g., a switch, is, in some embodiments, done via a secure method. Either via a secure shell connection, e.g., simple network management protocol version 3 (SNMPv3), or some other means that is encrypted.

The traffic that has been sent back to the MD from the POI, in many previous implementations, has been unencrypted between the POI and the MD. This is in part due to the complexities of public key infrastructure (PKI) and the desire to keep the MD isolated from other parts of the network.

By creating a Lawful Intercept Certificate Authority (LICA), in accordance with a feature of some embodiments, it becomes possible for the LICA to create, e.g., automatically, and revoke, e.g., automatically, certificates that can be used to create mutual TLS connections between MD and POI in an automated way by leveraging the existing provisioning interface.

Three components involved with various embodiments of the present invention are: i) a Mediation Device (MD), ii) a Point of Interception (POI), and iii) a Lawful Intercept Certificate Authority (LICA). The Mediation Device (MD) is a device that performs the provisioning, mediation, and delivery of intercepted communications. The Point of Intercept (POI) is the device in the network that performs the actual intercept and sends the intercepted communications back to the MD. The Lawful Intercept Certificate Authority (LICA) is the device that provides the Public Key Infrastructure (PKI) that the MD and POI would use to establish mutual Transport Layer Security (mTLS). There are 3 interfaces between the MD and POI: i) the X1 interface, ii) the X2 interface, and iii) the X3 interface. X1 is the provisioning interface and is done via encrypted means today X2 is the intercepted signaling information and X3 is the intercepted content communications. The LICA is configured with a user for the MD that has the rights to create users and certificates. The first thing it will do is to create a certificate for itself. That certificate and its key will be downloaded and installed on the MD. This is done once regardless of the number of POIs that are deployed.

To provision an intercept, the MD and POI needs to be configured to communicate to one another. The MD is typically given username and password as well as IP address and port of the PIO. The POI will be set up to grant access to the given username and to expect traffic from the IP address of the MD. During this setup process, the MD will connect to the LICA and request that a unique user is created for the POI. After that, a request for a certificate and key are created for the POI on the LICA by the MD. Once these steps are completed, the MD will connect via X1 and issue a set of commands. One of those commands would send the IP address of the LICA and the username and password for the unique POI user on the LICA.

Prior to the activation of an intercept on the POI, The POI would connect to the LICA with its user. The certificate and key would be downloaded from the LICA to the POI. The POI would install the certificate and use it to establish a mutual TLS connection.

A certificate contains a public key. The certificate may, and sometimes does, in addition to containing the public key, contains additional information such as issuer, what the certificate is supposed to be used for, and other types of metadata. In some embodiments, a certificate is itself signed by a certificate authority (CA), e.g., using CA's private key. This verifies the authenticity of the certificate.

A private key, of a public/private key pair is used to decrypt information encrypted with a corresponding public key of the public/private key pair.

In some embodiments, a "user" is an entity identified by a username which has the authority to request certificates from the LICA (law enforcement certificate authority—certificate authority component of the LISE). The LISE is first provisioned by the LI admin to recognize a user and provided with a password that the user can use.

Various additional aspects and/or features of some, but not necessarily all, embodiments of the present invention are described below.

The methods and apparatus described herein provide a mechanism for certificate generation for the LEA and CSP as well as provides a secure manner to exchange certificates in order to establish mutual TLS connections between devices, e.g., a mediation device, point of interception device and a law enforcement device, e.g., law enforcement computer or terminal used to review intercepted communication involved in a lawful intercept in an automated fashion eliminating the need for a VPN altogether. Because the methods described herein allow for automated mutual TLS establishment between devices via an automated process of requesting security certificates from a private certificate authority (e.g. the LICA) and then using the security certificates and corresponding keys, the methods are well suited for scaling to systems including a large number of points of intercept and without requiring a large amount of human operator involvement which might be required if there was human involvement required for each of the requesting, generation and use of individual security certificates.

The Mediation Device (MD) is a device that performs the provisioning, mediation, and delivery of intercepted communications to Law Enforcement. The Law Enforcement Monitoring Facility (LEMF) is the equipment used by Law Enforcement to receive the intercepted communications. The Lawful Intercept Certificate Authority (LICA) sits within the final component, the Lawful intercept Secrets Engine (LISE). The LICA is the device that provides the Public Key Infrastructure (PKI) that the MD and LEMF would use to establish mutual Transport Layer Security (mTLS). The LISE is the delivery mechanism for the certificates and keys between the LEA and CSP.

There are 3 interfaces between the MD and LEMF: HI1, HI2, and HI3. HI1 is the interface that is used by Law Enforcement to send warrant information. This interface is not used within the US. HI2 is the delivery interface for the intercepted signaling information and HI3 is the intercepted content communications. In various embodiments, the intercepted communications that would be delivered over the encrypted TLS connection would be HI2 and HI3. The secure delivery of intercept communications requires an encrypted channel of some kind. Historically this has been achieved over an IPSEC or other VPN tunnel. The advent and proliferation of TLS allows for encryption without the need for external networking equipment, such as a firewall or VPN concentrator. The MD and LEMF can mutually establish an encrypted tunnel using TLS certificates directly in an automated manner.

To utilize TLS for delivery a certificate and key need to be generated by the LICA for both the MD and the LEMF. The MD will need to have an account set up on the LISE that has the rights to create certificates and keys for both itself and LEMFs. The MD, using that account would create a certificate and key for itself and retrieve them. Then the MD would send a request to the LISE to create a profile for the LEMF. Using this profile a certificate and key would be generated. An access token would also be created at this time and sent to the MD for manual distribution to the LEA. The token would be installed on the LEMF. The IP address of the LISE would be programmed into the LEMF and the token would be used to authenticate and to retrieve the key and certificate from the LISE. After retrieval, the certificate and key would be installed on the LEMF. The identical process would occur on the MD in terms of creating a key and certificate. To perform the delivery of an intercept to a specific LEA, the MD needs to be provided the IP address and port of the LEMF. Since each side now has certificates and keys, this connection can now be negotiated via TLS and encrypted end-to-end.

References to other numbered embodiments in the following lists of numbered embodiments is intended to refer to a numbered embodiment in the same list. For example a reference to Method Embodiment 1 refers to the Method Embodiment 1 of the same list.

FIRST NUMBERED LIST OF EXEMPLARY METHOD EMBODIMENTS

Method Embodiment 1. A method of supporting lawful intercept, the method comprising: requesting (232), (e.g., performed by the mediation device) a security certificate (and corresponding private key) for a mediation device (MD) (118) from to a lawful intercept certificate authority (LICA) (121); receiving (244), at the mediation device (118), a mediation device private key and a corresponding mediation device security certificate from the LICA (121), said mediation device security certificate including a signature of the LICA (121) and a mediation device public key corresponding to the mediation device private key; establishing (414). (e.g., performed by the mediation device)

using the mediation device private key (and a point of intercept (POI) public key), a first mutual TLS connection between the mediation device (118) and POI (116) (e.g. using the keys provided to each of the MD (118) and POI (116) for mutual authentication); and receiving (452), at the mediation device (118), traffic intercepted by the POI (116) via said first mutual TLS connection.

Method Embodiment 2. The method of Method Embodiment 1, further comprising: receiving (214), at the mediation device (MD) (118), prior to requesting (232) the security certificate for the mediation device (118) from the LICA (121), a mediation device username and a password (e.g., supplied by a legal interception administrative device (LID 124) corresponding to the mediation device, said username and password corresponding to a user account with authorization to request certificates to be created by the lawful intercept certificate authority (LICA) (121)).

Method Embodiment 2A. The method of Method Embodiment 2, wherein said MD (118) automatically sends the said security certificate request in response to receiving the mediation device username and password.

Method Embodiment 3. The method of Method Embodiment 1, wherein said LICA (121) is part of a lawful intercept secrets engine (LISE) (120), the method further comprising: operating the MD (118) to authenticate (218) to the LISE (120) using the username and password provided to the MD (118) by a legal interception administrative device (LID) (124), and receiving (230) at the MD (118) a first security token from the LISE (120) to be presented when requesting a security certificate from the LICA (121) of the LISE (120).

Method Embodiment 4. The method of Method Embodiment 3, wherein requesting (232) the security certificate from the LICA (121) (e.g., sending (232) a request for a security certificate for the MD 118 to the LICA 112) includes: sending (232*a*) the first security token to the LICA (121).

Method Embodiment 5. The method of Method Embodiment 2, further comprising: communicating (284) information to be used for a certificate request (e.g., USE IP address, token, common name (e.g., common name for POI 116) and/or IP address (e.g., IP address for POI 116) to which a requested certificate is to be sent) to a point of interception (116) (e.g., a switch, router or other communications interception device which is to intercept and forward communications to the mediation device (118)).

Method Embodiment 6. The method of Method Embodiment 5, further comprising: sending (404), from the MD (118) a communications intercept request to the POI (116), said sending of the communications intercept request preceding said receiving (452), at the mediation device (118), traffic intercepted by the POI (116); and wherein said traffic intercepted by the POI (116) received by the MD (118) includes at least some traffic corresponding to the communications intercept request.

Method Embodiment 7. The method of Method Embodiment 6, further comprising operating the POI (116) to use information received from the MD (118) (e.g. the LISE IP address, token, common name and IP address to which the request for the certificate is sent) to request (290) a security certificate and private key to be used by the POI (116) from the LICA (121).

Method Embodiment 7A. The method of Method Embodiment 7, wherein the POI (116) automatically sends said request to the LICA for the security certificate in response to receiving the information from the MD (118) to be used in making the request.

Method Embodiment 8. The method of Method Embodiment 7, further comprising, operating the POI (116) to receive (302) a POI security certificate (including a public key corresponding to the POI and which is signed by the LICA (121)) and a corresponding POI private key from the LICA (121).

Method Embodiment 8A. The method of Method Embodiment 8, further comprising: operating (411) the POI (116) to obtain a public key of the MD (118) (e.g., from the LICA 120 or another server or from MD 118).

Method Embodiment 9. The method of Method Embodiment 8 wherein the POI (116) uses (412) the POI private key (and a MD public key) in establishing the mutual TLS connection between the MD (118) and POI (116).

FIRST NUMBERED LIST OF EXEMPLARY SYSTEM EMBODIMENTS

System Embodiment 1. A communications system (100) comprising: a mediation device (MD) (100 or 500) including a first processor (502) configured to operate the mediation device to: request (232). (e.g., performed by the mediation device) a security certificate (and corresponding private key) for a mediation device (MD) (118) from to a lawful intercept certificate authority (LICA) (121) (e.g., send a request for a security certificate and corresponding private key for MD 118 to LICA 121 of LISE 120 via transmitter 518), receive (244), at the mediation device (118) (e.g., via receiver 516), a mediation device private key and a corresponding mediation device security certificate from the LICA (121), said mediation device security certificate including a signature of the LICA (121) and a mediation device public key corresponding to the mediation device private key, establish (414), (e.g., performed by the mediation device) using the mediation device private key (and a point of intercept (POI) public key), a first mutual TLS connection between the mediation device (118) and POI (116) (e.g. using the keys provided to each of the MD (118) and POI (116) for mutual authentication), and receive (452) (e.g., via receiver 516), at the mediation device (118), traffic intercepted by the POI (116) via said first mutual TLS connection.

System Embodiment 2. The communications system of System Embodiment 1, wherein said first processor is further configured to operate the mediation device to receive (214) (e.g., via receiver 516), at the mediation device (MD) (118), prior to requesting (232) the security certificate for the mediation device (118) from the LICA (121), a mediation device username and a password (e.g., supplied by a legal interception administrative device (LID 124) corresponding to the mediation device, said username and password corresponding to a user account with authorization to request certificates to be created by the lawful intercept certificate authority (LICA) (121)).

System Embodiment 2A. The communications system of System Embodiment 2, wherein said MD (118) automatically sends said security certificate request in response to receiving the mediation device username and password (e.g. step 232 is executed by MD 118 automatically in response step 214).

System Embodiment 3. The communications system of System Embodiment 1, wherein said LICA 121 is part of a lawful intercept secrets engine (LISE) (120); and wherein said first processor (502) is further configured to operate the mediation device (118) to: authenticate (218) to the LISE (120) using the username and password provided to the MD (118) by a legal interception administrative device (LID) (124) (e.g., send the username and password, provided to the MD 118 by the LID 124, to the LISE 120 via transmitter 518 as part of an authentication operation); and receive (230) (via receiver 516) at the MD (118) a first security token from the LISE (120) to be presented when requesting a security certificate from the LICA (121) of the LISE (120).

System Embodiment 4. The communications system of System Embodiment 3, wherein said first processor (502) is configured to operate the mediation device (118) to: send (232*a*) (via transmitter 518) the first security token to the LICA (121) as part of being configured to operate the mediation device to request (232) the security certificate from the LICA (121).

System Embodiment 5. The communications system of System Embodiment 2, wherein said first processor (502) is further configured to operate the mediation device (118) to: communicate (284) (e.g., send via transmitter 518) information (e.g., LISE IP address, token, common name (e.g., common name for POI 116) and/or IP address (e.g., IP address for POI 116) to which a requested certificate is to be sent) to a point of interception (116) (e.g., a switch, router or other communications interception device which is to intercept and forward communications to the mediation device (118)).

System Embodiment 6. The communications system of System Embodiment 5, wherein said first processor (502) is further configured to operate the MD (118) to: send (404) (e.g., via transmitter 518), from the MD (118) a communications intercept request to the POI (116), said sending of the communications intercept request preceding said receiving (452), at the mediation device (118), traffic intercepted by the POI (116), and wherein said traffic intercepted by the POI (116) received by the MD (118) includes at least some traffic corresponding to the communications intercept request.

System Embodiment 7. The communications system (100) of System Embodiment 6, further comprising said POI (116 or 600) including a second processor (602); and wherein said second processor (602) is configured to: operate the POI (116) to use information received from the MD (118) (e.g. the USE IP address, token, common name and IP address to which the request for the certificate is sent) to request (290) a security certificate and private key to be used by the POI (116) from the LICA (121).

System Embodiment 7A. The communications system of System Embodiment 7, wherein said second processor (602) is configured to operate the POI (116) to automatically send (e.g., via transmitter 518) said request to the LICA (121) for the security certificate in response to receiving the information from the MD (118) to be used in making the request.

System Embodiment 8. The communications system of System Embodiment 7, wherein said second processor (602) is further configured to: operate the POI (116) to receive (302) (e.g., via receiver 616) a POI security certificate (including a public key corresponding to the POI and which is signed by the LICA (121)) and a corresponding POI private key from the LICA (121).

System Embodiment 8A. The communications system of System Embodiment 8, wherein said second processor (602) is further configured to: operate (411) the POI (116) to obtain a public key of the MD (118) (e.g., from the LICA 120 or another server or from MD 118).

System Embodiment 9. The communications system of System Embodiment 8, wherein said second processor (602) is further configured to operate the POI (116) to use (412) the POI private key (and a MD public key) in establishing the mutual TLS connection between the MD (118) and POI (116).

FIRST NUMBERED LIST OF EXEMPLARY NON-TRANSITORY

Computer Readable Medium Embodiments

Non-Transitory Computer Readable Medium Embodiment 1. A non-transitory computer readable medium (512) including machine executable instruction which when executed by a processor (502) of a mediation device (118 or 500) control the mediation device to perform the steps of: requesting (232). (e.g., performed by the mediation device) a security certificate (and corresponding private key) for a mediation device (MD) (118) from to a lawful intercept certificate authority (LICA) (121); receiving (244), at the mediation device (118), a mediation device private key and a corresponding mediation device security certificate from the LICA (121), said mediation device security certificate including a signature of the LICA (121) and a mediation device public key corresponding to the mediation device private key; establishing (414), (e.g., performed by the mediation device) using the mediation device private key (and a point of intercept (POI) public key), a first mutual TLS connection between the mediation device (118) and POI (116) (e.g. using the keys provided to each of the MD (118) and POI (116) for mutual authentication); and receiving (452), at the mediation device (118), traffic intercepted by the POI (116) via said first mutual TLS connection.

Non-Transitory Computer Readable Medium Embodiment 2. A non-transitory computer readable medium (612) including machine executable instruction which when executed by a processor (602) of a point of interception (POI) device (116 or 600) control the POI device to perform the steps of operating the POI (116) to use information received from the MD (118) (e.g. the USE IP address, token, common name and IP address to which the request for the certificate is sent) to request (290) a security certificate and private key to be used by the POI (116) from the LICA (121).

SECOND NUMBERED LIST OF EXEMPLARY METHOD EMBODIMENTS

Method Embodiment 1. A method of supporting lawful intercept, the method comprising: operating (340) a law enforcement device (e.g., law enforcement management facility (LEMF) device 128 or law enforcement agency (LEA) device 130) to receive information (e.g., IP address corresponding to lawful intercept secrets engine (LISE) (120) to be used to request a security certificate from a lawful intercept certificate authority (LICA) (121) in the LISE and/or token to be used in obtaining a security certificate) from a mediation device (118) to be used in requesting a security certificate from a lawful intercept certificate authority (LICA) (121); operating (342) the law enforcement device (128) to request a security certificate and private key from the LICA (121); and operating (360) the law enforcement device (128) to establish a mutual TLS connection with the MD (118) using a private key corresponding to the law enforcement device that is supplied by the LICA (121) (e.g., in response to the request for the security certificate).

Method Embodiment 2. The method of Method Embodiment 1, wherein said received information from the mediation device (118) to be used in requesting a security certificate from a lawful intercept certificate authority (LICA) (121) is received via a communications channel (e.g., an out-of-band communications channel) which is different from a connection (e.g., a mutual TLS connection) used to:

i) support intercept related control signals (e.g., HI2 interface signaling) between the MD (118) and law enforcement device (128) and ii) deliver intercepted traffic (e.g., HI3 interface signaling) from the MD (118) to the law enforcement device (128).

Method Embodiment 3. The method of Method Embodiment 1, wherein said received information from the mediation device (118) to be used in requesting a security certificate from the lawful intercept certificate authority (LICA 121) includes an IP address to be used for requesting the security certificate (e.g., the IP address of the LISE 120 including the LICA 121).

Method Embodiment 4. The method of Method Embodiment 3, wherein said received information from the mediation device (118) further includes a security token to be used to authenticate to the LICA (121) when requesting the security certificate.

Method Embodiment 5. The method of Method Embodiment 3, further comprising: operating (460) the law enforcement device (LEMF 128) to receive intercepted traffic from the MD (118) via the secure mutual TLS connection; and operating (462) the law enforcement device (LEMF 128) to recover intercepted traffic by using the private key from the LICA (121) (e.g., the LEMF's private key which was communicated to the LEMF from the LICA) to decrypt intercepted traffic communicated via the secure mutual TLS connection.

Method Embodiment 6. The method of Method Embodiment 5, further comprising, operating the mediation device (MD 118), prior to the mediation device (118) providing (336) said information from the mediation device (118) to be used in requesting the security certificate from the legal intercept certificate authority (LICA) (121), to: i) request (322) the token, to be used by the law enforcement device (128) to obtain a certificate, from a lawful intercept secrets engine (LISE) (120) (which includes the LICA 121); and ii) receive (334) the token from the USE (120).

Method Embodiment 7. The method of Method Embodiment 6, further comprising: operating (214) the mediation device (118) to receive a username and password from a legal intercept administrative device (LID) (124) to be used to authenticate to the LISE (124) when requesting a security token which can be used for certificate creation requests.

Method Embodiment 8. The method of Method Embodiment 7, further comprising: operating (244) the MD (118) to receive an MD certificate and corresponding MD private key from the LICA (121).

Method Embodiment 9. The method of Method Embodiment 7, further comprising, operating (232) the MD (18) to automatically request an MD security certificate and MD private key from the LICA (121) following being provisioned with the MD username and password that can be used by the MD to authenticate to the LISE (120).

Method Embodiment 10. The method of Method Embodiment 9, further comprising: operating (225) the MD to automatically request, using the MD username and password, a first token from the LISE (120) to be used to obtain the MD security certificate and MD private key.

Method Embodiment 11. The method of Method Embodiment 10, wherein the MD communicates the first token to the LISE (120) when requesting the MD security certificate.

SECOND NUMBERED LIST OF EXEMPLARY SYSTEM EMBODIMENTS

System Embodiment 1. A communications system (100) supporting lawful intercept, the communications system comprising: a law enforcement device (LEMF device 128 or LEA device 130 or device 900) including a first processor (902) configured to: operate (340) the law enforcement device (e.g., law enforcement management facility (LEMF) device 128 or law enforcement agency (LEA) device 130) to receive (e.g. via receiver 916) information (e.g., IP address corresponding to lawful intercept secrets engine (LISE) (120) to be used to request a security certificate from a lawful intercept certificate authority (LICA) (121) in the LISE and/or token to be used in obtaining a security certificate) from a mediation device (118) to be used in requesting a security certificate from a lawful intercept certificate authority (LICA) (121); operate (342) the law enforcement device (128) to request (e.g. via transmitter 918) a security certificate and private key from the LICA (121); and operate (360) the law enforcement device (128) to establish a mutual TLS connection with the MD (118) using a private key corresponding to the law enforcement device that is supplied by the LICA (121) (e.g., in response to the request for the security certificate).

System Embodiment 2. The communications system of System Embodiment 1, wherein said received information from the mediation device (118) to be used in requesting a security certificate from a lawful intercept certificate authority (LICA) (121) is received via a communications channel (e.g., an out-of-band communications channel) which is different from a connection (e.g., a mutual TLS connection) used to i) support intercept related control signals (e.g., HI2 interface signaling) between the MD (118) and law enforcement device (128) and ii) deliver intercepted traffic (e.g., HI3 interface signaling) from the MD (118) to the law enforcement device (128).

System Embodiment 3. The communications system of System Embodiment 1, wherein said received information from the mediation device (118) to be used in requesting a security certificate from the lawful intercept certificate authority (LICA 121) includes an IP address to be used for requesting the security certificate (e.g., the IP address of the LISE 120 including the LICA 121).

System Embodiment 4. The communications system of System Embodiment 3, wherein said received information from the mediation device (118) further includes a security token to be used to authenticate to the LICA (121) when requesting the security certificate.

System Embodiment 5. The communications system of System Embodiment 3, further comprising: operating (460) the law enforcement device (LEMF 128) to receive intercepted traffic from the MD (118) via the secure mutual TLS connection; and operating (462) the law enforcement device (LEMF 128) to recover intercepted traffic by using the private key from the LICA (121) (e.g., the LEMF's private key which was communicated to the LEMF from the LICA) to decrypt intercepted traffic communicated via the secure mutual TLS connection.

System Embodiment 6. The communications system of System Embodiment 5, further comprising: said mediation device (MD) (118 or 500) including a second processor (502) configured to: operate the mediation device (MD 118), prior to the mediation device (118) providing (336) said information from the mediation device (118) to be used in requesting the security certificate from the legal intercept certificate authority (LICA) (121), to: i) request (322) (e.g., via transmitter 518) the token, to be used by the law enforcement device (128) to obtain a certificate, from a lawful intercept secrets engine (LISE) (120) (which includes the LICA 121); and ii) receive (334) (e.g., via receiver 516) the token from the LISE (120).

System Embodiment 7 The communications system of System Embodiment 6, wherein said second processor (502) is further configured to: operate (214) the mediation device (118) to receive (e.g., via receiver 516) a username and password from a legal intercept administrative device (LID) (124) to be used to authenticate to the LISE (124) when requesting a security token which can be used for certificate creation requests.

System Embodiment 8 The communications system of System Embodiment 7, wherein said second processor (502) is further configured to: operate (244) the MD (118) to receive (e.g., via receiver 516) a MD certificate and corresponding MD private key from the LICA (121).

System Embodiment 9. The communications system of System Embodiment 7, wherein said second processor (502) is further configured to: operate (232) the MD (118) to automatically request (e.g. via transmitter 518) an MD security certificate and MD private key from the LICA (121) following being provisioned with the MD username and password that can be used by the MD to authenticate to the LISE (120).

System Embodiment 10. The communications system of System Embodiment 9, wherein said second processor (502) is further configured to: operate (225) the MD to automatically request (e.g., via transmitter 518), using the MD username and password, a first token from the LISE (120) to be used to obtain the MD security certificate and MD private key.

System Embodiment 11. The communications system of System Embodiment 10, wherein the MD communicates the first token to the LISE (120) when requesting the MD security certificate.

SECOND NUMBERED LIST OF EXEMPLARY

Non-Transitory Computer Readable Medium Embodiments

Non-Transitory Computer Readable Medium Embodiment 1. A non-transitory computer readable medium (912) including machine executable instruction which when executed by a processor (902) of a law enforcement device (LEMF device 128 or LEA device 130 or device 900) control the law enforcement device to perform the steps of: operating (340) the law enforcement device (e.g., law enforcement management facility (LEMF) device 128 or law enforcement agency (LEA) device 130) to receive information (e.g., IP address corresponding to lawful intercept secrets engine (LISE) (120) to be used to request a security certificate from a lawful intercept certificate authority (LICA) (121) in the LISE and/or token to be used in obtaining a security certificate) from a mediation device (118) to be used in requesting a security certificate from a lawful intercept certificate authority (LICA) (121); operating (342) the law enforcement device (128) to request a security certificate and private key from the LICA (121); and operating (360) the law enforcement device (128) to establish a mutual TLS connection with the MD (118) using a private key corresponding to the law enforcement device that is supplied by the LICA (121) (e.g., in response to the request for the security certificate).

Non-Transitory Computer Readable Medium Embodiment 2. A non-transitory computer readable medium (512) including machine executable instruction which when executed by a processor (502) of a mediation device (MD) (MD 118 or MD 500) control the mediation device to perform the steps of: operating the mediation device (MD 118) to request (322) (e.g. via transmitter 518) a token, to be used by the law enforcement device (128) to obtain a certificate, from a lawful intercept secrets engine (LISE) (120) (which includes the LICA 121); operating the mediation device (MD 118) to receive (334) (e.g. via receiver 516) the token from the LISE (120); and operating the mediation device (MD 118) to provide (336) (e.g., via transmitter 518) information (e.g. an IP address of a USE 120 including a LICA 121, and said token) to a law enforcement device (e.g., LEMF device 128 or LEA device 130) to be used by the law enforcement device in requesting a security certificate (and corresponding private key) (e.g., LEMF security certificate including a LEMF public key and the LEMF corresponding private key) from a legal intercept certificate authority (LICA) (121).

Various embodiments are directed to apparatus, e.g., mediation devices (MDs), e.g., lawful intercept mediation devices, point of interception (POI) devices, e.g., switches, security devices, e.g. a lawful intercept secrets engine (LISE) including a lawful intercept certificate authority (LICA), legal intercept administrative devices (LIDs), law enforcement management facility (LEMF) devices, law enforcement agency (LEA) devices, back office system (BOS) devices, legal department devices, user devices, base stations, e.g. CBSDs, cable modems (CMs), cable modem termination systems (CMTS), base stations supporting massive MIMO such as CBSDs supporting massive MIMO, network management nodes, access points (APs), e.g., WiFi APs, base stations such as NRU gNB base stations, etc., user devices such as stations (STAs), e.g., WiFi STAs, user equipment (JE) devices. LTE LAA devices, various types of RLAN devices, etc., other network communications devices such as routers, switches, etc., mobile network operator (MNO) base stations (macro cell base stations and small cell base stations) such as a Evolved Node B (eNB), gNB or ng-eNB, mobile virtual network operator (MVNO) base stations such as Citizens Broadband Radio Service Devices (CBSDs), network nodes, MNO and MVNO HSS devices, relay devices, e.g. mobility management entities (MMEs), a Spectrum Access System (SAS), an AFC system, an Access and Mobility Management Function (AMF) device, servers, customer premises equipment devices, cable systems, network nodes, gateways, cable headend and/or hubsites, network monitoring nodes and/or servers, cluster controllers, cloud nodes, production nodes, cloud services servers and/or network equipment devices. Various embodiments are also directed to methods, e.g., method of controlling and/or operating a mediation device (MD), e.g., lawful intercept mediation device, a point of interception (POI) device, e.g., a switch, a security device, e.g. a lawful intercept secrets engine (LISE) including a lawful intercept certificate authority (LICA), a legal intercept administrative device (LIDs), a law enforcement management facility (LEMF) device, a law enforcement agency (LEA) device, a back office system (BOS) device, a legal department device, a user device, a base station, e.g. a CBSD, a cable modems (CM), a cable modem termination system (CMTS), a base station supporting massive MIMO such as a CBSD supporting massive MIMO, a network management node, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, network communications devices such as routers, switches, etc., user devices, base stations, e.g., eNB and CBSDs, gateways, servers (HSS server), MMEs, SAS, an AFC system, cable networks, cloud networks, nodes, servers, cloud service servers, customer premises equipment devices, controllers, network monitoring nodes and/or servers and/or cable or network equipment devices. Various embodiments are directed to communications network which are partners, e.g., a communications service provider (CSP) network and a law enforcement network, and/or a MVNO network and a MNO network. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, determining and/or transmission steps. Thus, in some embodiments various features are implemented using components or in some embodiment's logic such as for example logic circuits. Such components may be implemented using software, hardware or a combination of software and hardware.

While the invention has been described in the context of a cable delivery system which uses a DOCSIS modem and coaxial cable in some embodiments, the methods and apparatus can be used in the context of other cable and modem combinations. In fact, the methods and apparatus can be used with a fiber optic cable and optical modem and/or with other types of cables and modems. Thus, it should be appreciated that a base station can use the described methods with a wide range of cable and modem combinations.

Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a mediation device (MD), e.g., lawful intercept mediation device, a point of interception (POI) device, e.g., a switch, a security device, e g, a lawful intercept secrets engine (LISE) including a lawful intercept certificate authority (LICA), a legal intercept administrative device (LIDs), a law enforcement management facility (LEMF) device, a law enforcement agency (LEA) device, a back office system (BOS) device, a legal department device, a user device, a base station, e.g. CBSD, a cable modems (CM), a cable modem termination system (CMTS), a base station supporting massive MIMO such as a CBSD supporting massive MIMO, a network management device, an access points (AP), e.g., WiFi AP, base stations such as NRU gNB base station, etc., a user device such as a station (STA), e.g., WiFi STA, a user equipment (UE) device, LTE LAA device, etc., an RLAN device, other network communications devices a network communications device such as router, switch, etc., a MVNO base station such as a CBRS base station, e.g., a CBSD, a device such as a cellular base station e.g., an eNB, a MNO HSS server, a MVNO HSS server, a UE device, a relay device, e.g. a MME, SAS, a AFC system, etc., said device including a processor configured to implement one, multiple or all of the steps of one or more methods of the invention.

In some embodiments, the processor or processors, e.g., CPUs, of one or more devices, e.g., a mediation device (MD), e.g., lawful intercept mediation device, a point of interception (POI) device, e.g., a switch, a security device, e.g. a lawful intercept secrets engine (LISE) including a lawful intercept certificate authority (LICA), a legal intercept administrative device (LIDs), a law enforcement management facility (LEMF) device, a law enforcement agency (LEA) device, a back office system (BOS) device, a legal department device, a user device, a base station, e.g. a CBSD, a cable modems (CM), cable modem termination system (CMTS), a base station supporting massive MIMO such as a CBSD supporting massive MIMO, a network management device, communications nodes such as e.g., access points (APs), e.g., WiFi APs, base stations such as NRU gNB base stations, etc., user devices such as stations (STAs), e.g., WiFi STAs, user equipment (UE) devices, LTE LAA devices, etc., various RLAN devices, network communications devices such as routers, switches, etc., a MVNO base station such as a CBRS base station, e g, a CBSD, an device such as a cellular base station e.g., an eNB, a MNO HSS server, a MVNO HSS device server, a UE device, a relay device, e.g. a MME, a SAS, a AFC system, are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration.

Accordingly, some but not all embodiments are directed to a device, e.g., a mediation device (MD), e.g., lawful intercept mediation device, a point of interception (POI) device, e.g., a switch, a security device, e g, a lawful intercept secrets engine (LISE) including a lawful intercept certificate authority (LICA), a legal intercept administrative device (LIDs), a law enforcement management facility (LEMF) device, a law enforcement agency (LEA) device, a back office system (BOS) device, a legal department device, a user device, a base station, e g, a CBSD, a cable modem (CM), a cable modem termination system (CMTS), a base station supporting massive MIMO such as a CBSD supporting massive MIMO, a network management device, an access points (AP), e.g., WiFi AP, a base station such as NRU gNB base station, etc., a user device such as station (STA), e.g., WiFi STA, a user equipment (UE) device, an LTE LAA device, etc., a RLAN device, a network communications device such as router, switch, etc., administrator device, security device, a MVNO base station such as a CBRS base station, e.g. a CBSD, an device such as a cellular base station e.g., an eNB, a MNO HSS server, a MVNO HSS device server, a UE device, a relay device, e.g. a MME, includes a component corresponding to each of one or more of the steps of the various described methods performed by the device in which the processor is included. In some but not all embodiments a device, e.g., a communications node such as e.g., a mediation device (MD), e.g., lawful intercept mediation device, a point of interception (POI) device, e.g., a switch, a security device, e.g. a lawful intercept secrets engine (LISE) including a lawful intercept certificate authority (LICA), a legal intercept administrative device (LIDs), a law enforcement management facility (LEMF) device, a law enforcement agency (LEA) device, a back office system (BOS) device, a legal department device, a user device, a base station, e.g. CBSD, a cable modem (CM), a cable modem termination systems (CMT), a base station supporting massive MIMO such as a CBSD supporting massive MIMO, a network management device, an access points (AP), e.g., WiFi AP, a base station such as NRU gNB base station, etc., a user device such as a station (STA), e.g., WiFi STA, a user equipment (UE) device, a LTE LAA device, a RLAN device, a router, switch, etc., administrator device, security device, a AFC system, a MVNO base station such as a CBRS base station, e.g., a CBSD, a device such as a cellular base station e.g., an eNB, an MNO HSS server, a MVNO HSS device server, a UE device, a relay device, e.g. a MME, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a mediation device (MD), e.g., lawful intercept mediation device, a point of interception (POI) device, e.g., a switch, a security device, e.g. a lawful intercept secrets engine (LISE) including a lawful intercept certificate authority (LICA), a legal intercept administrative device (LIDs), a law enforcement management facility (LEMF) device, a law enforcement agency (LEA) device, a back office system (BOS) device, a legal department device, a user device, a base station, e.g. CBSD, a cable modem (CM), a cable modem termination system (CMTS), a base station supporting massive MIMO such as a CBSD supporting massive MIMO, a network management node or device, a communications device such as a communications nodes such as e.g., an access point (AP), e.g., WiFi AP, a base station such as NRU gNB base station, etc., a user device such as a station (STA), e.g., WiFi STA, a user equipment (UE) device, a LTE LAA device, etc., an RLAN device, a network communications device such as router, switch, etc., administrator device, security device, a AFC system, MNVO base station, e.g., a CBSD, an MNO cellular base station, e.g., an eNB or a gNB, a HSS server, a UE device, a SAS or other device described in the present application In some embodiments, components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

In various locations in this application the point of interception device is also referred to as a point of intercept, a point of intercept device and/or a point of interception. It should be understood that such language refers to the same device.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of supporting lawful intercept, the method comprising:

operating a mediation device (MD) to obtain a security token from a lawful intercept certificate authority (LICA);

operating the MD to send the security token to a law enforcement device;

operating the law enforcement device to receive the security token from the MD;

operating the law enforcement device to send a request for a security certificate and a private key to the LICA, said request including the security token; and operating the law enforcement device to establish a secure connection with the MD, operating the law enforcement device to establish a secure connection with the MD including using keys for mutual authentication, said keys for mutual authentication including the private key corresponding to the law enforcement device that is supplied by the LICA in response to the request from the law enforcement device.

2. The method of claim 1, wherein said security certificate is received by the law enforcement device via a communications channel which is different from a connection used to: i) support intercept related control signals between the MD and the law enforcement device and ii) deliver intercepted traffic from the MD to the law enforcement device.

3. The method of claim 1, wherein the law enforcement device further receives from the MD an IP address to be used for requesting the security certificate.

4. The method of claim 3, further comprising:

operating the MD to perform an authentication operation with a lawful intercept secrets engine (LISE) in which said LICA is located, said authentication operation being a successful authentication operation; and sending the security token from the LICA to the MD following said successful authentication operation.

5. The method of claim 3, further comprising:

operating the law enforcement device to receive intercepted traffic from the MD via the secure connection; and operating the law enforcement device to recover intercepted traffic by using the private key from the LICA to decrypt intercepted traffic communicated via the secure connection.

6. The method of claim 5, further comprising:

operating the MD to request the security token, to be used by the law enforcement device to obtain a certificate, from a lawful intercept secrets engine (LISE) as part of obtaining the security token from the LICA.

7. The method of claim 6, further comprising:

operating the MD to receive a MD username and a password from a legal intercept administrative device (LID) to be used to authenticate to the LISE when requesting the security token which can be used for certificate creation requests.

8. The method of claim 7, further comprising:

operating the MD to receive a MD security certificate and a corresponding MD private key from the LICA.

9. The method of claim 7, further comprising:

operating the MD to automatically request the MD security certificate and the corresponding MD private key from the LICA following being provisioned with the MD username and the password that can be used by the MD to authenticate to the LISE.

10. The method of claim 9, further comprising:

operating the MD to automatically request, using the MD username and the password, the security token from the LISE to be used to obtain the MD security certificate and the corresponding MD private key.

11. The method of claim 10, wherein the MD communicates the security token to the LISE when requesting the MD security certificate.

12. A communications system supporting lawful intercept, the communications system comprising:

a mediation device (MD) including a MD processor configured to control the MD to obtain a security token from a lawful intercept certificate authority (LICA) and send the security token to a law enforcement device;

the law enforcement device, said law enforcement device including a first processor configured to control the law enforcement device to:

receive the security token from the MD;

send a request for a security certificate and a private key to the LICA, said request including the security token; and establish a secure connection with the MD using keys for mutual authentication, said keys including the private key corresponding to the law enforcement device that is supplied by the LICA in response to the request from the law enforcement device.

13. The communications system of claim 12, wherein said security certificate is received by the law enforcement device via a communications channel which is different from a connection used to: i) support intercept related control signals between the MD and law enforcement device and ii) deliver intercepted traffic from the MD to the law enforcement device.

14. The communications system of claim 12, wherein said first processor in the law enforcement device is further configured to control the law enforcement device to:

receive from the MD an IP address to be used for requesting the security certificate.

15. The communications system of claim 14, wherein said received information from the MD further includes the security token to be used to authenticate to the LICA when requesting the security certificate.

16. The communications system of claim 14, wherein the first processor is further configured to control the law enforcement device to:

receive intercepted traffic from the MD via the secure connection; and recover intercepted traffic by using the private key from the LICA to decrypt intercepted traffic communicated via the secure connection.

17. The communications system of claim 16, wherein the MD processor is further configured to control the MD to: request the security token, to be used by the law enforcement device to obtain the security certificate, as part of obtaining the security token from the LICA.

18. The communications system of claim 17, wherein said MD processor is further configured to control the MD to:

receive a MD username and a password from a legal intercept administrative device (LID) to be used to authenticate to a lawful intercept secrets engine (LISE) when requesting the security token which can be used for certificate creation requests.

19. The communications system of claim 18, wherein said MD processor is further configured to control the MD to:

receive a MD security certificate and a corresponding MD private key from the LICA.

20. The communications system of claim 19, wherein said MD processor is further configured to control the MD to:

automatically request the MD security certificate and the corresponding MD private key from the LICA following being provisioned with the MD username and the password that can be used by the MD to authenticate to the LISE.

* * * * *